(12) United States Patent
Johnson et al.

(10) Patent No.: US 8,606,811 B2
(45) Date of Patent: *Dec. 10, 2013

(54) ELECTRONIC PUBLICATION SYSTEM

(75) Inventors: Brian Scott Johnson, Campbell, CA (US); Alvaro Bolivar, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 13/247,798

(22) Filed: Sep. 28, 2011

(65) Prior Publication Data

US 2012/0016893 A1    Jan. 19, 2012

Related U.S. Application Data

(63) Continuation of application No. 11/869,290, filed on Oct. 9, 2007, now Pat. No. 8,051,040.

(60) Provisional application No. 60/942,897, filed on Jun. 8, 2007.

(51) Int. Cl.
*G06F 17/30* (2006.01)

(52) U.S. Cl.
USPC ........... 707/769; 707/736; 707/748; 707/913; 707/928; 707/627; 707/608; 709/206; 709/207; 709/201; 709/203; 709/213; 709/217

(58) Field of Classification Search
USPC ......... 707/736, 748, 769, 913, 928, 627, 608; 709/206, 207, 201, 203, 213, 217
See application file for complete search history.

(56) References Cited

U.S. PATENT DOCUMENTS

| | | | |
|---|---|---|---|
| 4,996,642 A | 2/1991 | Hey | |
| 5,535,382 A | 7/1996 | Ogawa | |
| 5,583,763 A | 12/1996 | Atcheson et al. | |
| 5,749,081 A | 5/1998 | Whiteis | |
| 5,778,363 A | 7/1998 | Light | |
| 5,790,790 A | 8/1998 | Smith et al. | |
| 5,825,881 A | 10/1998 | Colvin, Sr. | |
| 5,842,199 A | 11/1998 | Miller et al. | |

(Continued)

FOREIGN PATENT DOCUMENTS

| | | |
|---|---|---|
| EP | 0957437 A2 | 11/1999 |
| GB | 2366033 | 2/2002 |

(Continued)

OTHER PUBLICATIONS

"U.S. Appl. No. 10/689,970, Supplemental Notice of Allowability mailed Jul. 26, 2010", 6 pgs.

(Continued)

*Primary Examiner* — Frantz Coby
(74) *Attorney, Agent, or Firm* — Schwegman Lundberg & Woessner, P.A.

(57) ABSTRACT

A system and method for modifying publication data in a publication system are described. An example embodiment includes receiving proposed publication data and accessing a success measurement associated with past publications within a publication system. The success measurement may indicate a measurement of success associated with the past publications. An example system and method may generate modification data to be used to modify the proposed publication data. The modification data may be based on the success measurement and proposed publication data.

20 Claims, 10 Drawing Sheets

(56) References Cited

U.S. PATENT DOCUMENTS

| | | |
|---|---|---|
| 5,845,265 A | 12/1998 | Woolston |
| 5,873,001 A | 2/1999 | Brinker et al. |
| 5,897,622 A | 4/1999 | Blinn et al. |
| 5,963,910 A | 10/1999 | Ulwick |
| 6,006,225 A | 12/1999 | Bowman et al. |
| 6,016,475 A | 1/2000 | Miller et al. |
| 6,047,264 A | 4/2000 | Fisher et al. |
| 6,049,777 A | 4/2000 | Sheena et al. |
| 6,055,513 A | 4/2000 | Katz et al. |
| 6,085,176 A | 7/2000 | Woolston |
| 6,101,484 A | 8/2000 | Halbert et al. |
| 6,108,493 A | 8/2000 | Miller et al. |
| 6,119,101 A | 9/2000 | Peckover |
| 6,119,137 A | 9/2000 | Smith et al. |
| 6,169,986 B1 | 1/2001 | Bowman et al. |
| 6,178,408 B1 | 1/2001 | Copple et al. |
| 6,192,407 B1 | 2/2001 | Smith et al. |
| 6,195,657 B1 | 2/2001 | Rucker et al. |
| 6,202,051 B1 | 3/2001 | Woolston |
| 6,205,456 B1 | 3/2001 | Nakao |
| 6,243,691 B1 | 6/2001 | Fisher et al. |
| 6,266,649 B1 | 7/2001 | Linden et al. |
| 6,308,168 B1 | 10/2001 | Dovich et al. |
| 6,313,745 B1 | 11/2001 | Suzuki |
| 6,321,221 B1 | 11/2001 | Bieganski |
| 6,334,127 B1 | 12/2001 | Bieganski et al. |
| 6,356,879 B2 | 3/2002 | Aggarwal et al. |
| 6,370,513 B1 | 4/2002 | Kolawa et al. |
| 6,393,389 B1 | 5/2002 | Chanod et al. |
| 6,412,012 B1 | 6/2002 | Bieganski et al. |
| 6,430,558 B1 | 8/2002 | Delano |
| 6,438,579 B1 | 8/2002 | Hosken |
| 6,466,918 B1 | 10/2002 | Spiegel et al. |
| 6,487,539 B1 | 11/2002 | Aggarwal et al. |
| 6,490,577 B1 | 12/2002 | Anwar |
| 6,499,029 B1 | 12/2002 | Kurapati et al. |
| 6,671,681 B1 | 12/2003 | Emens et al. |
| 6,701,309 B1 | 3/2004 | Beeferman et al. |
| 6,704,727 B1 | 3/2004 | Kravets |
| 6,714,929 B1 | 3/2004 | Micaelian et al. |
| 6,732,088 B1 | 5/2004 | Glance |
| 6,772,150 B1 | 8/2004 | Whitman et al. |
| 6,782,370 B1 | 8/2004 | Stack |
| 6,785,676 B2 | 8/2004 | Oblinger |
| 6,859,807 B1 | 2/2005 | Knight et al. |
| 6,901,399 B1 | 5/2005 | Corston et al. |
| 6,963,850 B1 | 11/2005 | Bezos et al. |
| 7,092,936 B1 | 8/2006 | Alonso et al. |
| 7,225,182 B2 | 5/2007 | Paine et al. |
| 7,340,428 B1 | 3/2008 | White et al. |
| 7,814,112 B2 | 10/2010 | Gupta et al. |
| 7,831,476 B2 | 11/2010 | Foster et al. |
| 8,051,040 B2 * | 11/2011 | Johnson et al. ............... 707/627 |
| 8,200,683 B2 | 6/2012 | Gupta et al. |
| 8,200,687 B2 | 6/2012 | Gupta |
| 2001/0021914 A1 | 9/2001 | Jacobi et al. |
| 2001/0037255 A1 | 11/2001 | Tambay |
| 2002/0016786 A1 | 2/2002 | Pitkow et al. |
| 2002/0019763 A1 | 2/2002 | Linden et al. |
| 2002/0059116 A1 | 5/2002 | Bulatovic et al. |
| 2002/0065802 A1 | 5/2002 | Uchiyama |
| 2002/0069190 A1 | 6/2002 | Geiselhart |
| 2002/0082901 A1 | 6/2002 | Dunning et al. |
| 2002/0103789 A1 | 8/2002 | Turnbull et al. |
| 2002/0107853 A1 | 8/2002 | Hofmann et al. |
| 2002/0143660 A1 | 10/2002 | Himmel et al. |
| 2002/0147724 A1 | 10/2002 | Fries et al. |
| 2002/0156686 A1 | 10/2002 | Kraft et al. |
| 2002/0184116 A1 | 12/2002 | Tam et al. |
| 2002/0198882 A1 | 12/2002 | Linden et al. |
| 2003/0009411 A1 * | 1/2003 | Ram et al. ............... 705/37 |
| 2003/0014428 A1 | 1/2003 | Mascarenhas |
| 2003/0014501 A1 | 1/2003 | Golding et al. |
| 2003/0028527 A1 | 2/2003 | Crosby et al. |
| 2003/0037050 A1 | 2/2003 | Monteverde |
| 2003/0040850 A1 | 2/2003 | Najmi et al. |
| 2003/0050863 A1 | 3/2003 | Radwin |
| 2003/0055831 A1 | 3/2003 | Ryan et al. |
| 2003/0093331 A1 | 5/2003 | Childs et al. |
| 2003/0130994 A1 | 7/2003 | Singh et al. |
| 2003/0195877 A1 | 10/2003 | Ford et al. |
| 2003/0229537 A1 | 12/2003 | Dunning et al. |
| 2004/0034652 A1 | 2/2004 | Hofmann et al. |
| 2004/0068495 A1 | 4/2004 | Inaba et al. |
| 2004/0098385 A1 | 5/2004 | Mayfield et al. |
| 2004/0103092 A1 | 5/2004 | Tuzhilin et al. |
| 2004/0128321 A1 | 7/2004 | Hamer |
| 2004/0153463 A1 | 8/2004 | Sasai et al. |
| 2004/0181604 A1 | 9/2004 | Immonen |
| 2004/0193612 A1 | 9/2004 | Chang |
| 2004/0205558 A1 | 10/2004 | Holloway et al. |
| 2004/0236736 A1 | 11/2004 | Whitman et al. |
| 2004/0260621 A1 | 12/2004 | Foster et al. |
| 2005/0039136 A1 | 2/2005 | Othmer |
| 2005/0076003 A1 | 4/2005 | DuBose et al. |
| 2005/0091209 A1 | 4/2005 | Frank et al. |
| 2005/0102259 A1 | 5/2005 | Kapur |
| 2005/0102282 A1 | 5/2005 | Linden |
| 2005/0125392 A1 | 6/2005 | Curtis et al. |
| 2005/0192992 A1 | 9/2005 | Reed et al. |
| 2005/0198068 A1 | 9/2005 | Mukherjee et al. |
| 2005/0234881 A1 | 10/2005 | Burago et al. |
| 2005/0234972 A1 | 10/2005 | Zeng et al. |
| 2005/0283488 A1 | 12/2005 | Colossi et al. |
| 2006/0026113 A1 | 2/2006 | Omoigui |
| 2006/0031340 A1 | 2/2006 | Mathew et al. |
| 2006/0053096 A1 | 3/2006 | Subramanian et al. |
| 2006/0074864 A1 | 4/2006 | Naam et al. |
| 2006/0080292 A1 | 4/2006 | Alanzi |
| 2006/0085391 A1 | 4/2006 | Turski et al. |
| 2006/0106769 A1 | 5/2006 | Gibbs |
| 2006/0129533 A1 | 6/2006 | Purvis |
| 2006/0161520 A1 | 7/2006 | Brewer et al. |
| 2006/0161534 A1 | 7/2006 | Carson, Jr. et al. |
| 2006/0167857 A1 | 7/2006 | Kraft et al. |
| 2006/0195442 A1 | 8/2006 | Cone et al. |
| 2006/0206475 A1 | 9/2006 | Naam et al. |
| 2006/0212447 A1 | 9/2006 | Davis et al. |
| 2006/0224554 A1 | 10/2006 | Bailey et al. |
| 2006/0224587 A1 | 10/2006 | Zamir et al. |
| 2006/0230005 A1 | 10/2006 | Bailey et al. |
| 2006/0230040 A1 | 10/2006 | Curtis et al. |
| 2006/0242129 A1 | 10/2006 | Libes et al. |
| 2006/0248078 A1 | 11/2006 | Gross et al. |
| 2006/0253458 A1 | 11/2006 | Dixon et al. |
| 2006/0271524 A1 | 11/2006 | Tanne et al. |
| 2006/0288000 A1 | 12/2006 | Gupta |
| 2007/0118802 A1 | 5/2007 | Gerace et al. |
| 2007/0288433 A1 | 12/2007 | Gupta et al. |
| 2008/0077574 A1 | 3/2008 | Gross |
| 2008/0147661 A1 | 6/2008 | Carden |
| 2008/0306938 A1 | 12/2008 | Johnson et al. |
| 2010/0017398 A1 | 1/2010 | Gupta et al. |
| 2010/0250341 A1 * | 9/2010 | Hauser ............... 705/10 |
| 2010/0325011 A1 | 12/2010 | Foster et al. |
| 2011/0055040 A1 | 3/2011 | Foster et al. |
| 2012/0239679 A1 | 9/2012 | Gupta |

FOREIGN PATENT DOCUMENTS

| | | |
|---|---|---|
| JP | 2002092032 | 12/1990 |
| JP | 2005032193 | 9/1996 |
| JP | 09244945 | 9/1997 |
| JP | 11250086 A | 9/1999 |
| JP | 2002123544 | 4/2002 |
| JP | 2002215659 | 8/2002 |
| JP | 2004502213 | 1/2004 |
| JP | 2005063277 A | 3/2005 |
| TW | I370373 B | 8/2012 |
| WO | WO-0017792 A1 | 3/2000 |
| WO | WO-0017793 A1 | 3/2000 |
| WO | WO-0045319 A1 | 8/2000 |
| WO | WO-0116848 A2 | 3/2001 |
| WO | WO-0129726 A2 | 4/2001 |

(56) References Cited

FOREIGN PATENT DOCUMENTS

| WO | WO-0131537 A2 | 5/2001 |
|---|---|---|
| WO | WO-0133401 A2 | 5/2001 |
| WO | WO-0219203 A2 | 3/2002 |
| WO | WO-0229695 A1 | 4/2002 |
| WO | WO-0237926 A2 | 5/2002 |
| WO | WO-2004114155 A1 | 12/2004 |
| WO | WO-2007001980 A2 | 1/2007 |
| WO | WO-2007001980 A3 | 1/2007 |

OTHER PUBLICATIONS

"U.S. Appl. No. 10/689,970, Appeal Brief filed Jun. 28, 2007", 26 pgs.
"U.S. Appl. No. 10/689,970, Examiner's Answer mailed Oct. 2, 2007", 14 pgs.
"U.S. Appl. No. 10/689,970, Final Office Action mailed Jan. 25, 2007", 18 pgs.
"U.S. Appl. No. 10/689,970, Non Final Office Action mailed Jun. 13, 2006", 14 pgs.
"U.S. Appl. No. 10/689,970, Notice of Allowance mailed Jan. 20, 2010", 9 pgs.
"U.S. Appl. No. 10/689,970, Notice of Allowance mailed Jun. 29, 2010", 6 pgs.
"U.S. Appl. No. 10/689,970, Reply Brief filed Dec. 3, 2007", 10 pgs.
"U.S. Appl. No. 10/689,970, Response filed Oct. 13, 2006 to Non Final Office Action mailed Jun. 13, 2006", 11 pgs.
"U.S. Appl. No. 11/323,486, Advisory Action mailed Feb. 9, 2010", 4 pgs.
"U.S. Appl. No. 11/323,486, Advisory Action mailed Jul. 29, 2011", 3 pgs.
"U.S. Appl. No. 11/323,486, Appeal Brief Filed Oct. 24, 2011".
"U.S. Appl. No. 11/323,486, Final Office Action mailed Oct. 7, 2008", 34 pgs.
"U.S. Appl. No. 11/323,486, Final Office Action mailed Nov. 17, 2009", 33 pgs.
"U.S. Appl. No. 11/323,486, Final Offiec Action mailed Mar. 23, 2011", 46 pgs.
"U.S. Appl. No. 11/323,486, Non-Final Office Action mailed Jan. 11, 2008", 22 pgs.
"U.S. Appl. No. 11/323,486, Non-Final Office Action mailed Mar. 17, 2009", 33 pgs.
"U.S. Appl. No. 11/323,486, Non-Final Office Action mailed May 3, 2010", 37 pgs.
"U.S. Appl. No. 11/323,486, Non-Final Office Action mailed Oct. 1, 2010", 43 pgs.
"U.S. Appl. No. 11/323,486, Response filed Jan. 3, 2011 to Non Final Office Action mailed Oct. 1, 2010", 14 pgs.
"U.S. Appl. No. 11/323,486, Response filed Jan. 7, 2009 to Final Office Action mailed Oct. 7, 2008", 11 pgs.
"U.S. Appl. No. 11/323,486, Response filed Jan. 18, 2010 to Final Office Action mailed Nov. 17, 2009", 14 pgs.
"U.S. Appl. No. 11/323,486, Response filed Mar. 17, 2010 to Advisory Action mailed Feb. 9, 2010", 12 pgs.
"U.S. Appl. No. 11/323,486, Response filed Jun. 11, 2008 to Non-Final Office Action mailed Jan. 11, 2008", 17 pgs.
"U.S. Appl. No. 11/323,486, Response filed Jun. 23, 2011 to Final Office Action mailed Mar. 23, 2011", 18 pgs.
"U.S. Appl. No. 11/323,486, Response filed Jul. 9, 2010 to Non Final Office Action mailed May 3, 2010", 14 pgs.
"U.S. Appl. No. 11/323,486, Response filed Jul. 17, 2009 to Non Final Office Action mailed Mar. 17, 2009", 12 pgs.
"U.S. Appl. No. 11/679,973, Advisory Action mailed Nov. 23, 2009", 3 pgs.
"U.S. Appl. No. 11/679,973, Appeal Brief filed May 13, 2010", 24 pgs.
"U.S. Appl. No. 11/679,973, Decision on Pre-Appeal Brief Request mailed Apr. 13, 2010", 2 pgs.
"U.S. Appl. No. 11/679,973, Final Office Action mailed Aug. 21, 2009", 13 pgs.
"U.S. Appl. No. 11/679,973, Non Final Office Action mailed Mar. 18, 2009", 3 pgs.
"U.S. Appl. No. 11/679,973, Notice of Allowance mailed Jun. 9, 2010", 17 pgs.
"U.S. Appl. No. 11/679,973, Pre-Appeal Brief Request filed Dec. 21, 2009", 5 pgs.
"U.S. Appl. No. 11/679,973, Response filed Jun. 12, 2009 to Non Final Office Action mailed Mar. 18, 2009", 12 pgs.
"U.S. Appl. No. 11/679,973, Response filed Nov, 5, 2009 to Final Office Action mailed Aug. 21, 2009", 13 pgs.
"U.S. Appl. No. 11/869,290, Final Office Action mailed Jul. 8, 2010", 27 pgs.
"U.S. Appl. No. 11/869,290, Non-Final Office Action mailed Dec. 24, 2009", 29 pgs.
"U.S. Appl. No. 11/869,290, Notice of Allowance mailed Aug. 22, 2011", 6 pgs.
"U.S. Appl. No. 11/869,290, Response filed Apr. 26, 2010 to Non Final Office Action mailed Dec. 24, 2009", 17 pgs.
"U.S. Appl. No. 11/869,290, Response filed Nov. 8, 2010 to Final Office Action mailed Jul. 8, 2010", 19 pgs.
"U.S. Appl. No. 12/495,663, Final Office Action mailed Mar. 28, 2011", 11 pgs.
"U.S. Appl. No. 12/495,663, Non Final Office Action mailed Nov. 17, 2010", 17 pgs.
"U.S. Appl. No. 12/495,663, Response filed Feb 17, 2011 to Non Final Office Action mailed Nov. 17, 2010", 13 pgs.
"U.S. Appl. No. 12/495,663, Response filed Jun. 28, 2011 to Final Office Action mailed Mar. 28, 2011", 14 pgs.
"U.S. Appl. No. 12/870,022 , Response filed Sep. 13, 2011 to Final Office Action mailed Jul. 28, 2011", 13 pgs.
"U.S. Appl. No. 12/870,022, Advisory Action mailed Sep. 26, 2011", 3 pgs.
"U.S. Appl. No. 12/870,022, Advisory Action mailed Nov. 9, 2011", 4 pgs.
"U.S. Appl. No. 12/870,022, Decision on Pre-Appeal Brief mailed Nov. 14, 2011", 2 pgs.
"U.S. Appl. No. 12/870,022, Final Office Action mailed Jul. 28, 2011", 15 pgs.
"U.S. Appl. No. 12/870,022, Non Final Office Action mailed Mar. 17, 2011", 13 pgs.
"U.S. Appl. No. 12/870,022, Pre-Appeal Brief Request filed Oct. 4, 2011", 5 pgs.
"U.S. Appl. No. 12/870,022, Response filed Jun. 3, 2011 to Non Final Office Action mailed Mar. 17, 2011", 16 pgs.
"Australian Application No. 2006262446, Examiner Report Mailed Jan. 15, 2010", 2 pgs.
"Australian Application Serial No. 2006262446, Response filed Dec. 24, 2009 to Examiner Report mailed Mar. 20, 2009", 24 pgs.
"Australian Application Serial No. 2006262446, Examiner Report mailed Mar. 20, 2009", 3 pgs.
"Australian Application Serial No. 2006262446, Response filed Mar. 23, 2010 to Examiner Report mailed Jan. 15, 2010", 25 pgs.
"Australian Application Serial No. 2010202828, First Examiner Report mailed Apr. 20, 2011", 1 pg.
"Chinese Application Serial No. 200680022268.9, Office Action mailed Nov. 17, 2010", 3 pgs.
"Chinese Application Serial No. 200680022268.9, Office Action Mailed Jul. 26, 2009", 28 pgs.
"Chinese Application Serial No. 200680022268.9, Office Action Received Jan. 7, 2011", 17 pgs.
"Chinese Application Serial No. 200680022268.9, Office Action Received Aug. 11, 2009", 30 pgs.
"Chinese Application Serial No., Response filed Feb. 9, 2011 to Non Final Office Action mailed Nov. 17, 2010", 40 pgs.
"European Application Serial No. 06773535.7, EP Search Report", 13 pgs.
"European Application Serial No. 06773535.7, Extended European Search Report mailed Sep. 24, 2010", 9 Pgs.
"International Application Serial No. PCT/US03/33294, International Preliminary Report on Patentability mailed Jan. 30, 2006", 4 pgs.
"International Application Serial No. PCT/US03/33294, International Search Report mailed Jun 14, 2005", 8 pgs.

(56) References Cited

OTHER PUBLICATIONS

"International Application Serial No. PCT/US03/33294, Written Opinion mailed Sep. 28, 2005", 4 pgs.

"International Application Serial No. PCT/US2006/023807, International Preliminary Report on Patentability mailed Jan. 10, 2008", 5 pgs.

"International Application Serial No. PCT/US2006/023807, International Search Report and Written Opinion mailed Feb. 28, 2007" 9 pgs.

"Japanese Application Serial No. 2008-517212, Office Action mailed Apr. 12, 2011", 6 pgs.

"Japanese Application Serial No. 2008-517212, Office Action mailed Aug. 3, 2010", 6 Pgs.

"Japanese Application Serial No. 2008-517212, Office Action Response filed", 10 pgs.

"Japanese Application Serial No. 2008-517212, Office Action Response Filed Oct. 28, 2010", 23 pgs.

"Query—Definition by Dictionary.com", [Online]. Retrieved from the Internet: <http://dictionary.reference.com/browse/query>, (Accessed 2011), 1 pg.

"Taiwan Application Serial No. 95122021,Office Action mailed Jul. 12, 2011".

"Taiwanese Application Serial No. 95122021, Office Action mailed Nov. 2, 2011", 13 pgs.

"Taiwanese Application Serial No. 95122021, Response filed Aug. 19, 2011 to Office Action mailed Jul. 12, 2011", 40 pgs.

Andale Gallery, "Prominently Featured on Your Listings", [Online]. Retrieved from the Internet: <URL: http://www.andale.com/corp/tour/gal_tour4.html> Accessed on Web—Apr. 15, 2005, (Copyright 2001), Web Page.

Ardissono, Liliana, et al., "Tailoring the Interaction With Users in Electronic Shops", Proceedings of the Seventh International Conference on User Modeling, Banff, Canada, (1999), 35-44.

Balabanovic, Marko, "An Adaptive Web Page Recommendation Service", Stanford University Digital Libraries Project Working Paper, Proceedings of the First International Conference on Autonomous Agents, (1999), 378-385.

Breese, John S, et al., "Empirical Analysis of Predictive Algorithms for Collaborative Filtering", Technical Report MSR-TR-98-12—Microsoft Research, (May 1998—Revised Oct. 1998), 1-21.

Burke, Robin, "The Wasabi Personal Shopper: a case-based recommender system", Proceedings of the Sixteenth National Conference on Artificial Intelligence and the Eleventh Innovative Applications of Artificial Intelligence Conference Innovative Applications of Artificial Intelligence, (1999), 844-849.

Buyukkokten, O., et al., "Efficient web browsing on handheld devices using page and form summarization", ACM Transactions on Information Systems, 20(1), (2002), 82-115.

Chan, Susy, et al., "Useability for mobile commerce across multiple form factors", Journal of Electronic Commerce Research, 3(3), (2002), 187-199.

Changchien, S, "Mining association rules procedure to support online recommendation by customers and product fragmentation", Expert Systems with Application, 20(4), (May 2001), 325-335.

Cheung, N., "Buy this! [e-commerce recommendation software]", Information Age, (Feb. 2001), 33-4.

Cheung, W., "Mining customer preference ratings for product recommendation using the support vector machine and the latent class model", Proceedings of the 2nd International Conference on Data Mining Methods and Databases for Engineering, Finance and Other Fields, Cambridge, UK, (Jul. 2000), 601-10.

Chien, Yi-Ying, "A personalized Internet shopping agent", Proceedings of the International Conference on Parallel and Distributed Processing Techniques and Applications. PDPTA'2000, pt. 4, (2000), 1849-55.

Chun, In-Gook, et al., "The implementation of knowledge-based recommender system for electronic commerce using Java expert system library", International Symposium on Industrial Electronics, 2001. Proceedings. ISIE 2001, vol. 3, (Jun. 12-16, 2001), 1766-1770.

Claypool, Mark, et al., "Inferring User Interest (Aug. 2001)", Computer Science Technical Report Series, (Aug. 31, 2001), 1-17.

Cotlier, Moira, "The Electronic Catalog: Upselling Online Can Raise Top Line", Catalog Age, 18(7), (Jun. 1, 2001), 93.

Demiriz, Ayhan, "Enhancing Product Recommender Systems on Sparse Binary Data", E-Buisiness Department, Verizon, Inc., (2002), 1-17.

Ebizautos, "eBay Motors Auction Management System for Auto & Motorcycle Dealers", [Online]. Retrieved from the Internet: <URL: http://www.ebizautos.com/>, (Copyright 2001-2005), Web Page.

Greco, Carl, "What you should know before joining an Internet Mall", Direct Marketing, 61(10), (Feb. 1999), 42-3.

Harvey, L, ""On Birthdays" mortgages, ice cream sundaes, and term life. How personalization and cross selling tools provide cross-selling in the enterprise", E-business Strategies & Solutions, (Jul. 1999), 31-5.

Hassel, Martin, et al., "SweSum—Automatic Text Summarizer", [Online]. Retrieved from the Internet: <URL: http://swesum.nada.kth.se/index-eng.html>, (2005), 1 pg.

Hirooka, Yasuo, et al., "Extending Content-Based Recommendation by Order-Matching and Cross-Matching Methods", Lecture Notes In Computer Science; vol. 1875, Proceedings of the First International Conference on Electronic Commerce and Web Technologies, (2000), 177-90.

Hong, Se June, et al., "A New Approach for Item Choice Recommendations", Proceedings of the Third International Conference on Data Warehousing and Knowledge Discovery, (2001), 131-140.

Iacobucci, Dawn, "Recommendation Agents on the Internet", Journal of Interactive Marketing, 14(3), (2000), 2-11.

Kanemoto, H, "Web Customer Action Analysis System", Matsushita Technical Journal, 48(1), (Feb. 2002), 26-9.

Karypis, George, "Evaluation of Item-Based Top-N Recommendation Algorithms", Technical Report #00-046, http://www-users.cs.umn.edu/~karypis/publications/Papers/PDF/itemrs.pdf, (2000), 1-13.

Kitts, Brendan, et al., "Cross-sell: A Fast Promotion-Tunable Customer-item Recommendation Method Based on Conditionally Independent Probabilities", Proceedings of the sixth ACM SIGKDD international conference on Knowledge discovery and data mining, Boston, MA USA, (Aug. 2000), 437-446.

Kohrs, Arnd, et al., "Using category-based collaborative filtering in the Active WebMuseum", 2000 IEEE International Conference on Multimedia and Expo, 2000. ICME 2000, vol. 1, (Jul. 30-Aug. 2, 2000), 351-354.

Kumar, Ravi, "Recommendation Systems: A Probabilistic Analysis", Journal of Computer and System Sciences, 63(1), (Aug. 2001), 42-61.

Kwak, Mary, "Web Sites Learn To Make Smarter Suggestions", MIT Sloan Management Review, 42(4), (Summer 2001), 17.

Kwak, Mira, "Collaborative filtering with automatic rating for recommendation", IEEE International Symposium on Industrial Electronics, 2001. Proceedings. ISIE 2001, vol. 1, (Jun. 12-16, 2001), 625-628.

Kyeonah, Yu, "Improving the performance of collaborative recommendation by using multi-level similarity computation", Artificial Intelligence and Soft Computing : Proceedings of the IASTED International Conference (Jul. 24-26, 2000), 241-5.

Lee, Wee Sun, "Collaborative Learning for Recommender Systems", Proceedings of the Eighteenth International Conference on Machine Learning, (2001), 314-321.

Lin, Weiyang, et al., "Efficient Adaptive-Support Association Rule Mining for Recommender Systems", Data Mining and Knowledge Discovery, 6(1), (2001), 83-105.

Linden, G, et al., "Amazon.com recommendations item-to-item collaborative filtering", IEEE Internet Computing vol. 7, No. 1, DOI : 10.1109/MIC 2003; XP011095524, (Jan. 1, 2003), 76-80.

Loney, Fred N, "Faceted Preference Matching in Recommender Systems", Proceedings of the Second International Conference on Electronic Commerce and Web Technologies, (2001), 295-304.

Maes, Pattie, et al., "Agents that Buy and Sell", Communications of the ACM 42(3), (Mar. 1999), 81-91.

McAllister, Neil, "Getting Personal", New Architect, (Nov. 2001), 1-8.

(56) References Cited

OTHER PUBLICATIONS

Nextag, "Computer Letter, Private Profiles—NexTag—Of all the auction sites on the Web, here's one an economist might like", [Online]. Retrieved from the Internet: <URL: http://www.nextag.com/serv/main/about/computer/letter.html>, (Aug. 23, 1999).

Ohkubo, M., et al., "Extracting Information Demand by Analyzing a WWW Search Log", Transactions of Information Processing Society of Japan, 39(7), (Jul. 15, 1998), 2250-2258.

Pedersen, P., "Behavioral Effects of Using Software Agents for Product and Merchant Brokering: An Experimental Study of Consumer Decision-Making", International Journal of Electronic Commerce, 5(1), (Fall 2000), 125-141.

Pennock, David M, et al., "Social Choice Theory and Recommender Systems: Analysis of the Axiomatic Foundations of Collaborative Filtering", Proceedings of the Seventeenth National Conference on Artificial Intelligence and Twelfth Conference on Innovative Applications of Artificial Intelligence, (2000), 729-734.

Ramakrishnan, N, et al., "Privacy risks in recommender systems", IEEE Internet Computing, 5(6), (Nov.-Dec. 2001), 54-63.

Roe, Andy, "Amazon Adds Seller Services", Accessed through following address—http://web.archive.org/web/20000816024400/http://www.auctionwatch.com/awdaily/dailynews/august99/3-081899.html, (Aug. 18, 1999), Web Page.

Sarwar, B., et al., "Analysis of recommendation algorithms for e-commerce", Proceedings of the 2nd ACM conference on EC, (2000), 158-167.

Schafer, J, et al., "E-commerce recommendation applications", Data Mining and Knowledge Discovery, 5(1-2), (2001), 115-153.

Schafer, J., et al., "E-Commerce Recommendation Applications", GroupLens Research Project, Dept. of Computer Science & Engineering, University of Minnesota, Minneapolis, (2001), 1-24.

Schafer, J. Ben, et al., "Recommender Systems in E-Commerce", Department of Science and Engineering—University of Michigan, (2001), 1-9.

Schien, Andrew I, et al., "Methods and Metrics for Cold-Start Recommendations", Proceedings of the 25th Annual International ACM SIGIR Conference on Research and Development in Information Retrieval (SIGIR 2002), (2002), 1-9.

Schubert, Petra, "Virtual Communities of Transaction:The Role of Personalization in Electronic Commerce", Electronic Markets Journal, 10(1), (2000), 1-13.

Seitz, Juergen, et al., "Impacts of Software Agents in E-Commerce Systems on Customer?s Loyalty and on Behavior of Potential Customers", Chapter 13 from Strategies for eCommerce Success: by Bijan Fazlollahi, IRM Press, (2000), 9 pgs.

Towle, Brendon, et al., "Knowledge Based Recommender Systems Using Explicit User Models", Knowledge Based Electronic Markets, (2000), 74-7.

Tran, T., "Hybrid Recommender Systems for Electronic Commerce", Proceedings of the Seventeenth National Conference on Artificial Intelligence (AAAI-00) Workshop on Knowledge-Based Electronic Markets, (2000), 78-84.

Websphere, "WebSphere Commerce Professional Edition—Features", [Online]. Retrieved from the Internet: <URL: http://www-306.ibm.com/software/genservers/commerce/wcpe/>, (Downloaded Apr. 21, 2005), Webpage.

Wilder, C, et al., "E-Commerce Emerges", Information Week, No. 584, (Jun. 17, 1996), 14-15.

Yang, Christopher, et al., "Fractal Summarization for Mobile Devices to Access Large Documents on the Web", Proceedings International WWW Conference, Budapest, Hungary., (2003), 17 pgs.

"U.S. Appl. No. 11/323,486, Examiner Interview Summary mailed Feb. 8, 2012", 1 pg.

"U.S. Appl. No. 11/323,486, Notice of Allowance Mailed Feb. 8, 2012", 17 pgs.

"U.S. Appl. No. 11/323,486, Notice of Allowance mailed Mar. 6, 2012", 9 pgs.

"U.S. Appl. No. 11/323,486, Response Filed Feb. 15, 2012 to Notice of Allowance mailed Feb. 8, 2012", 8 pgs.

"U.S. Appl. No. 12/495,663, Notice of Allowance mailed Feb. 15, 2012", 14 pgs.

"U.S. Appl. No. 12/870,022, Advisory Action mailed Jan. 19, 2012", 3 pgs.

"U.S. Appl. No. 12/870,022, Appeal Brief filed Jan. 10, 2012", 23 pgs.

"U.S. Appl. No. 12/870,022, Examiner's Answer to Appeal Brief mailed May 29, 2012", 13 pgs.

"U.S. Appl. No. 12/870,022, Reply Brief filed Jul. 30, 2012", 3 pgs.

"U.S. Appl. No. 12/870,031, Final Office Action mailed Apr. 25, 2013", 16 pgs.

"U.S. Appl. No. 12/870,031, Non Final Office Action mailed Sep. 26, 2012", 15 pgs.

"U.S. Appl. No. 12/870,031, Response filed Dec. 26, 2012 to Non Final Office Action mailed Sep. 26, 2012", 16 pgs.

"U.S. Appl. No. 13/485,002 , Response filed May 13, 2013 to Final Office Action mailed Feb. 14, 2013", 12 pgs.

"U.S. Appl. No. 13/485,002, Final Office Action mailed Feb. 14, 2013", 32 pgs.

"U.S. Appl. No. 13/485,002, Final Office Action mailed Sep. 14, 2012", 28 pgs.

"U.S. Appl. No. 13/485,002, Non Final Office Action mailed Jun. 10, 2013", 31 pgs.

"U.S. Appl. No. 13/485,002, Response filed Dec. 14, 2012 to Non Final Office Action mailed Sep. 14, 2012", 10 pgs.

"U.S. Appl. No. 13/491,183, Final Office Action mailed Apr. 10, 2013", 15 pgs.

"U.S. Appl. No. 13/491,183, Non Final Office Action mailed Nov. 15, 2012", 13 pgs.

"U.S. Appl. No. 13/491,183, Response filed Feb. 15, 2013 to Non Final Office Action mailed Nov. 15, 2012", 10 pgs.

"U.S. Appl. No. 13/875,074, Non Final Office Action mailed Jun. 27, 2013", 17 pgs.

"U.S. Appl. No. 13/875,074, Preliminary Amendment filed May 7, 2013", 5 pgs.

"Taiwanese Application Serial No. 95122021, Notice of Allowance mailed Jun. 12, 2012", with English translation, 3 pgs.

"Taiwanese Application Serial No. 95122021, Response filed Dec. 29, 2011", with English translation of claims, 28 pgs.

* cited by examiner

ELECTRONIC PUBLICATION SYSTEM

RELATED APPLICATIONS

This application is a continuation of U.S. application Ser. No. 11/869,290 filed Oct. 9, 2007 now U.S. Pat. No. 8,051,040, entitled, "ELECTRONIC PUBLICATION SYSTEM," which claims the priority benefit of U.S. Provisional Application Ser. No. 60/942,897 filed Jun. 8, 2007 and entitled "SYSTEM DESCRIBING AN UNPUBLISHED ITEM IN AN ELECTRONIC PUBLICATION SYSTEM," which applications are incorporated herein by reference.

FIELD

Embodiments relate generally to an electronic publication system and method. More specifically, example embodiments are related to publications describing items in an electronic publication system.

BACKGROUND

The Internet may be described as a network of network nodes that communicate via various transmission media. The use of information communicated over the Internet varies but the information is sometimes presented to human beings at a user interface as language or images. Internet communications may be used to carry out electronic publication systems such as an electronic marketplace.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Overview

Figure 1:
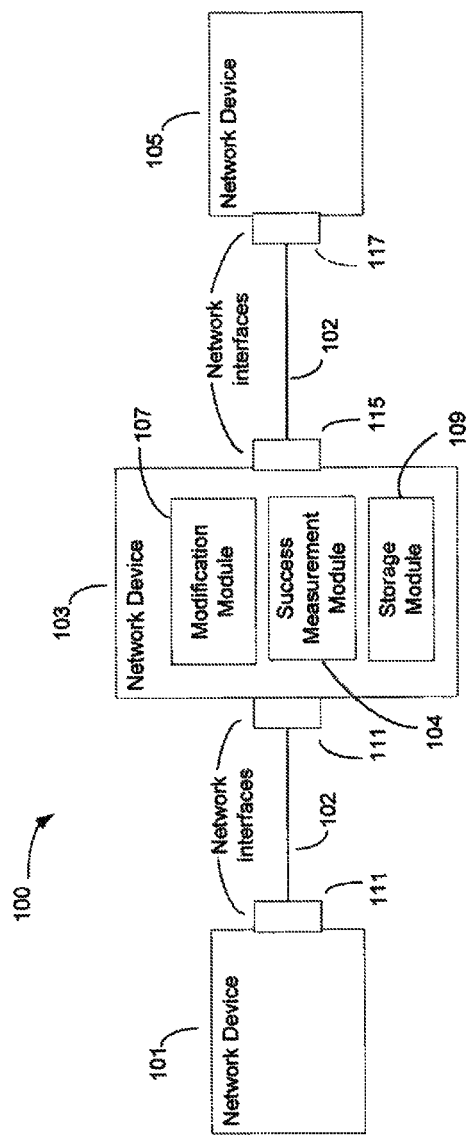
FIG. 1 is a block diagram of a network publication system in accordance with example embodiments.

A method and system for modifying publication data are disclosed. In the following description, for purposes of explanation, numerous specific details are set forth in order to provide a thorough understanding of the present subject matter. It will be apparent, however, to one skilled in the art that the present subject matter can be practiced without these specific details.

In an electronic marketplace, a proprietor may facilitate transactions between a seller and a buyer. Some providers of information (e.g., sellers) wish to help unite their information with those members of the Internet who seek it (e.g., buyers). As used herein the words "information" and "data" may be used interchangeably.

One technique for uniting a member of the Internet with information involves providing an interface for a user to describe the information that the user would like to retrieve (e.g., using a search or browse interface). In this technique, information providers may predict the user's description and associate their prediction with the particular set of information that is thought to be what the user desires. However, different users may each use different and unrelated information (e.g., words) to describe a single entity or concept (e.g., an item for sale). As a result, a user may search or browse but not find the information or data he or she seeks.

In general, a method and system are described for providing modification data to modify publication data. Members of a publication system community (e.g., publication originators, sellers, etc.) may classify items that are the subject of publications. A publication may be related to a published item and include publication data (e.g., attributes and/or other information to be provided in a publication, etc.) used to describe the item. An item may be any tangible or intangible thing and/or or something that has a distinct, separate existence from other things (e.g., goods, services, electronic documents, organizations, ideas, philosophies, religions, and/or any other item, etc.)

The success of a description or classification of an item may be indicated by the community's behavior (e.g., positive or negative) related to the classification. With a flow of feedback from the community, a publication system may provide classification modifications (e.g., recommended and/or compulsory) for proposed publication data.

Example embodiments described herein disclose an electronic publication system (e.g., an electronic search engine, electronic library, electronic classified advertisement publication system, marketplace, etc.) to generate modification data and recommend or mandate that publication originators (e.g., sellers) and/or publication queriers (e.g., buyers) use the modification data. The recommended or compulsory modification data may be used by publication originators in formulating descriptions of items (e.g., offered for sale) for publication, in an effort to make the descriptions more readily locatable by publication queriers. Publication queriers may use the modification data to be directed to a publication within the electronic publication system.

In an example embodiment, item records are accessed from an item table. The item records include information, describing items, that are the subjects of publications (e.g., posted on a webpage to be accessed by the public) in an electronic marketplace. The item records may also include an indication of whether particular items have been sold or otherwise transacted via the marketplace. The descriptions associated with successfully sold items may be considered to be successful descriptions that should continue to be used to describe the successful sold item. In an example embodiment, after receiving an item identifier (e.g., a title and a category) from a publication originator (e.g., a seller) wishing to publish information about an item, applications provide modification information that may be used to describe the publication originator's item. In an example embodiment, the modification data is the result of a computation based on the item identifier and the item records that are associated with successfully sold items.

In the following detailed description of the embodiments, reference is made to the accompanying drawings that show, by way of illustration, specific embodiments that may be practiced. In the drawings, like numerals describe substantially similar components throughout the several views. These embodiments are described in sufficient detail to enable implementation by those skilled in the art. Other embodiments may be utilized, and structural, logical, and electrical changes may be made without departing from the scope of the present invention. Moreover, it is to be understood that the various embodiments of the invention, although different, are not necessarily mutually exclusive. For example, a particular feature, structure, or characteristic described in an embodiment may be included within other embodiments. The following detailed description is, therefore, not to be taken in a limiting sense, and the scope of the present invention is defined only by the appended claims, along with the full scope of equivalents to which such claims are entitled.

Some portions of the detailed descriptions that follow are presented in terms of algorithms and symbolic representations of operations on data bits within a computer system's registers or memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present description, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

Example Embodiments

FIG. 1 is a block diagram illustrating an electronic publication system or network publication system 100 in accordance with example embodiments. The electronic publication system 100 may support the publication and distribution of information.

The electronic publication system 100 is shown to include network devices 101, 103 and 105 communicatively coupled to one another via a transmission medium 102. It is to be appreciated that various example electronic publication systems 100 need not be coupled to a network to support the publication and distribution of information. Some example electronic publication systems may include one or more electronic devices from which a user may directly and in person access and view information or to which a human user may directly and in person enter information (e.g., via physical interfaces such as a mouse, keyboard, display screen and/ other any other user interfaces).

Users (not shown), may use the network devices 101, 103, 105. A user may be a human being, software, electronic hardware, or any other form of user, etc., that uses the electronic publication system 100 to publish, search, access and/ or view published information and/or buy or sell items associated with published information. An example user includes a publication originator (e.g., a user that submits publication data to provide content for a future publication).

The network devices 101, 103 and 105 may include any electronic device that processes information according to a list of instructions and/or that implements logic using hardware, software or a combination thereof. In an example embodiment, the network devices 101, 103 and 105 are computers each including a central processing unit (CPU) to manipulate information. The network devices 101, 103 and 105 may include input output (I/O) ports (111, 113, 115, 117) to provide an interface between the network devices 101, 103 and 105 and the transmission medium 102 and to enable the network devices 101, 103 and 105 to receive and/or transmit information to and/or from the transmission medium 102. The transmission medium 102 may be any medium suitable for carrying information between the network devices 101, 103 and 105. Example embodiments may include combinations of transmission media that have various physical forms and collectively form an overall physical transmission medium (e.g. a combination of optical fiber, wireless, and twisted pairs coupled by routers, switches and/or other network devices, etc.).

The network devices 101, 103 and 105 may communicate with other network nodes (not shown) coupled to the transmission medium 102 using various communication protocols. In example embodiments, the network devices 101 and 103 may communicate over the transmission medium 102 using 10 gigabit Ethernet, Internet SCSI (iSCSI), Fibre Channel, and/or any other protocol compatible with other network nodes.

The storage module 109 may be operative to store all types of data associated with the electronic publication system. An example storage module 109 may store publication data, success measurements, demand data and other information, etc.). One or more success measurements (described in more detail below) may be associated with a publication for an item. The storage module 109 may be implemented with hardware, software or a hardware/software combination. An example storage module 109 may be a main memory to store information (e.g., organized into data structures) and is made accessible to the modification module 107 of an electronic commerce server (e.g., the network device 103).

The modification module 107 may be operative to modify publication data (e.g., data used in publications to describe items) with modification data. In an example embodiment, modification data includes a variety of information that is substantially similar to publication data and may include attribute names, attribute values, keywords, categories, titles, search terms, browse paths and other descriptive information, etc. The collection of information and the generation of modification data described with respect to the modification module 107 may be implemented with hardware, software or their combination.

An example modification module 107 may compute modification data, access information stored within the storage module 109, receive information from users via the network devices 101, 105 and the transmission medium 102, and cause information to be transmitted to users via the network devices 101, 105 and the transmission medium 102.

A success measurement module 104 may be operative to measure levels of success related to the electronic publication system 100. A success measurement may be an indicator of a publication's level of success. The level of success of a publication may indicate how well or how poorly the publication was received by a community of information consumers (e.g., users), how accessible (e.g., easily locatable) the publication was to the community of publication queriers, or the level reaction or activity related to the publication by the community of publication queriers. The level of success of a publication may be affected by how well an item, which is the subject of the publication, was described by all or a part of the publication. In an example embodiment, a level of success depends on whether a publication originator providing publication data for a publication engages in an interaction associated with the publication, with a publication querier. An example interaction may include a financial transaction.

Example success measurements may be referred to as demand data. Demand data may include, an indication of whether a particular item was sold, a demand measurement may register sales for individual items, the number of times a particular item was viewed on a webpage by potential buyer(s), the number of times a particular item was added to a watch list by potential buyer(s) or the search term(s) and/or browse path(s) used by potential buyer(s) to find a particular item. A browse path may be defined by categories and/or attribute name-value pairs (discussed in more detail below).

An example embodiment of the network device 103 may facilitate transactions between users and thus may be able to track publications that are associated with interactions (e.g., viewing of item listings, successful transactions, sale of items, etc.) between a publication originator (e.g., a seller) and a publication querier (e.g., a buyer).

In an example embodiment, the electronic publication system 100 includes an electronic marketplace 100 that further includes items offered for sale, sellers, buyers (e.g., operating from network nodes 101, 105) and a market proprietor (e.g., operating from network device 103). The market proprietor may facilitate finding, buying and/or selling of items. Items may include goods and/or a services published, located, bought and sold in an electronic marketplace. Descriptive data for an item in an electronic marketplace, such as publication data or modification data, may include titles, categories, category identifiers, attribute names, attribute values, keywords, and other publication data assigned to an item.

The users may include sellers and buyers. A seller may be a user of the electronic marketplace 100 who offers items for sale and sells items via the network device 101 (e.g., a personal computer). A buyer may be a user of the electronic marketplace 100 who shops for items via the network device 105 (e.g., a personal computer). A buyer need not buy any items and may be referred to herein as a potential buyer. A buyer who actually buys an item may be referred to as an actual buyer. In an example embodiment, a potential buyer (e.g., a buyer) may search for items of interest and/or finds items of interest and an actual buyer is one who may have purchased items of interest in the electronic marketplace 100.

Figure 2:
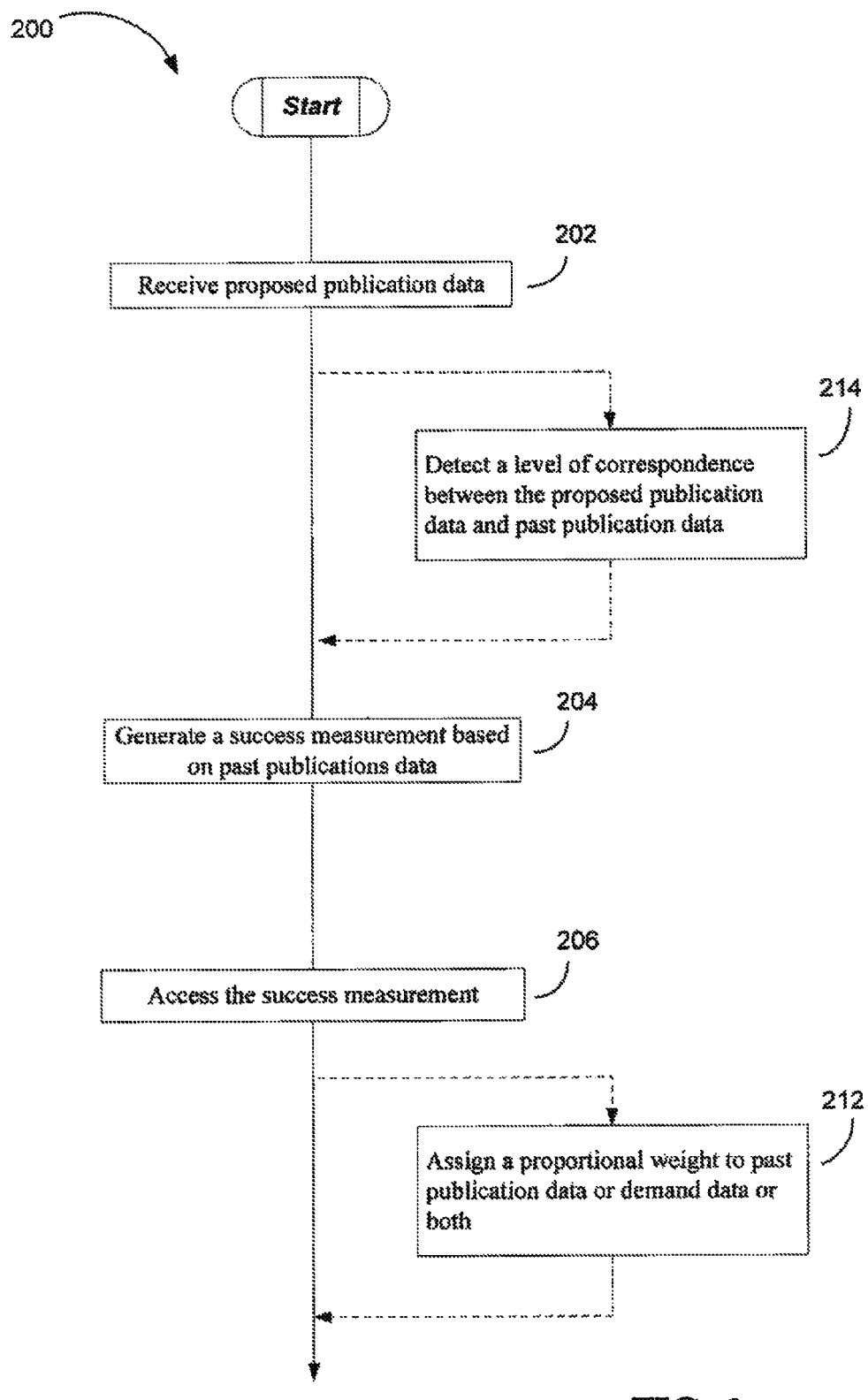
FIG. 2 is a flow diagram illustrating a method in accordance with an example embodiment for generating modification to modify publication data.

FIG. 2 is a flow diagram illustrating a method 200 in accordance with an example embodiment for generating modification data to modify publication data. In an example embodiment the method is executed within the network device 103. The method 200 starts at processing block 202 with receiving proposed publication data (e.g., second publication data, which may include an item title, an item itself, or other item descriptors, etc.).

In an example embodiment, a seller (e.g., a second publication originator) via the network device 101 (e.g., a home computer, laptop, handheld device, or any other network device, etc.) provides the proposed publication data to the modification module 107. The proposed publication data, which may include a title and a category, may describe an item (e.g., a second item) that the seller wishes to sell and is associated with a publication (e.g., a second publication) that has not yet been published in the electronic publication system 100.

At block 204 the method 200 continues with, (e.g., the success measurement module 104) generating a success measurement (e.g., demand data or a demand measurement) based on past publications (e.g., the first publication data) and storing the success measurement within the storage module 109. The past publications may describe published items (e.g., listings for goods in an online marketplace) and the success measurement may indicate a measurement of success associated with the publications (e.g., a number of times users searching for an item found the item via a certain publication).

In an example embodiment, the storage module 109 stores the past publication data and demand data (e.g., the first demand data) that may be accessed by the modification module 107. The demand data may include a demand measurement that registers interactions (e.g., sales facilitated by the network publication system) associated with the past publications and between the seller (e.g., the publication originator) and the buyer (e.g., the publication querier).

The method continues at processing block 206 with (e.g., the modification module 107) accessing the success measurement (e.g., a demand measurement) associated with the past publications (e.g., the first publications).

Figure 3:
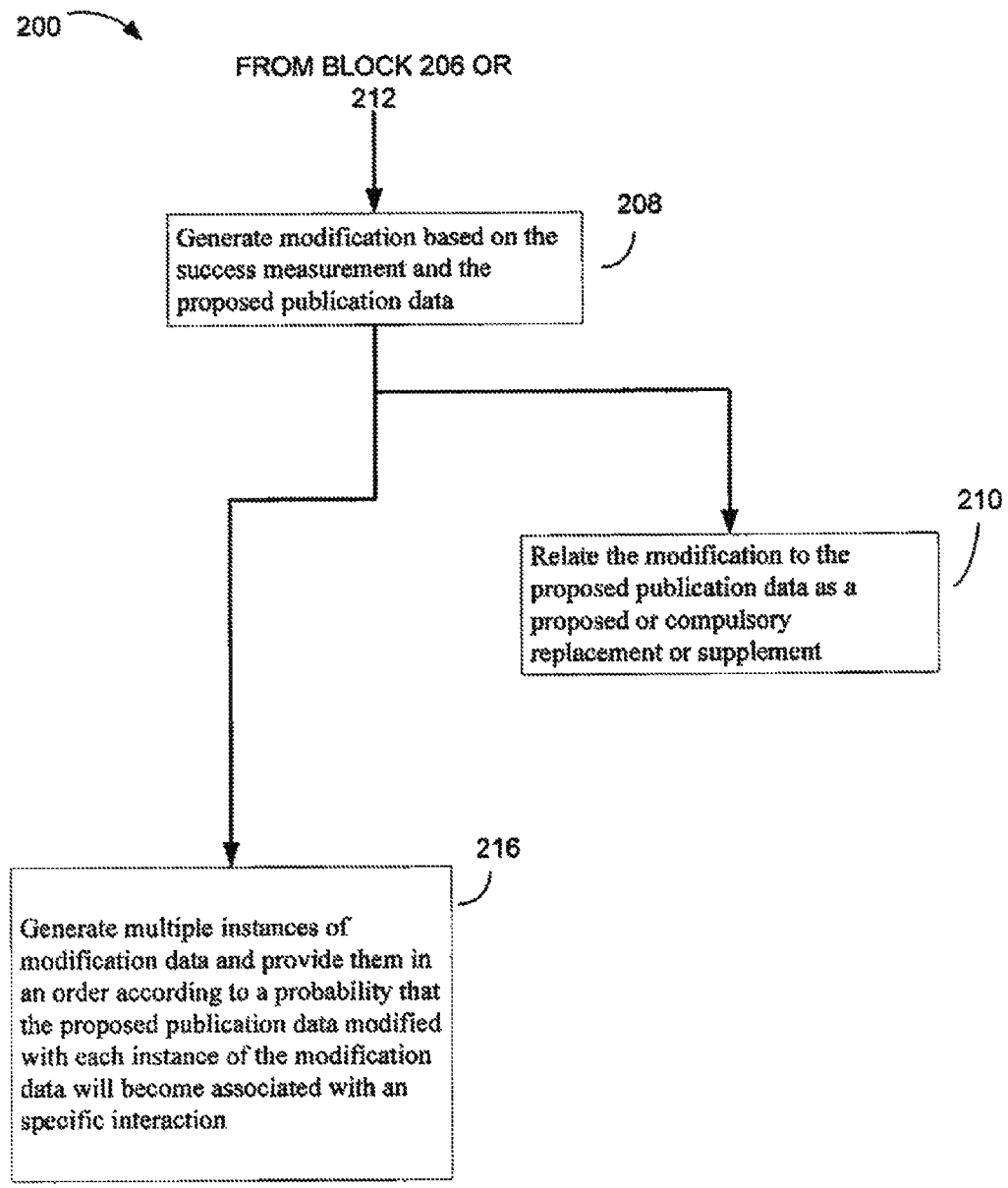
FIG. 3 continues the flow diagram illustrated in FIG. 2.

At processing block 208 in FIG. 3, the method 200 includes (e.g., the modification module) generating modification data (e.g., the first modification data) that is to modify the proposed publication data. The modification data may be based on the success measurement (e.g., measuring the success of the past publication data) and the proposed publication data.

An example modification module 107 may generate modification data (e.g., the first modification data) with which to modify the proposed publication data (e.g., the second publication data). In an example embodiment, the modification data is based on the demand data (e.g., that measures demand related to the past publication data) and the proposed publication data.

The modification module 107 may provide, via the transmission medium 102, modification data to a user (e.g., a seller and/or a buyer) on a network device 101, 105. The modification data may be offered to help the user describe an item (e.g., in the seller's publication related to the item) in a way that may improve the probability that the published item will be transacted (e.g., a positive interaction between seller and buyer).

In an example embodiment, the storage module 109 stores multiple instances of past publication data, and the demand data (e.g., the first demand data) includes demand measurements that register at least one interaction associated with instances of past publication data. In an example embodiment, the modification module 107 uses the multiple instances of past publication data and the demand measurements to generate the modification data. The demand measurements may register financial transactions (e.g., a sale of an item described in a publication), queries (e.g., a search and/or a browse path used to locate a publication), viewings of a publication, assignments of a publication to a monitoring list or any other interaction related to a publication that may indicate a demand associated with the publication or the subject matter thereof.

In an example embodiment, past publication data for successfully sold items is used in generating the modification data. In this example embodiment, past publication data for un-sold items is excluded from the generation of the modification data. Past publication data including words that describe successfully sold items may be more likely to be commonly used by buyers and sellers to describe an item. When these words (and e.g., other associated words) are used as publication data to describe the items, the items may be more likely to be associated with a successful transaction and/or to be found by a buyer, etc., after the items are described with the words in a publication.

Block 210 in FIG. 3, (e.g., the modification module 107 or e.g., other processing logic) may include assigning a proportional weight to the instances of past publication data or the demand data or both. Such an assignment of the proportional weight may control a corresponding level of effect on the resulting modification data.

The modification module 107 may assign a proportional weight to instances of the past publication data and/or a portion of the instances of the past publication data in generating modification data. The modification module 107 may also assign a proportional weight to the demand data and/or a portion of the demand data (e.g., instances of demand measurements) in generating modification data. Portions or subsets of the past publication data may include descriptive information concerning successfully sold, un-sold and/or other status, etc. items. Portions or subsets of the demand data may include search, browse, view, assignment to a list to be monitored (e.g., a watch list) and/or other navigational or user action information concerning items. In an example embodiment, the modification module 107 may assign 70% weight to past publication data describing successfully sold items and 5% weight to that describing un-sold items; as for demand data, a 5% weight to searches made (and e.g., subsequent views and watches) and 10% weight to browse paths followed (and e.g., subsequent views and watches) for each item.

Block 212, (e.g., the modification module 107) relates the modification data (e.g., the first modification data) to the proposed publication data (e.g., the second publication data) as a recommended replacement, a recommended supplement, a compulsory replacement or a compulsory supplement. In some example embodiments, the modification module 107 generates the modification data for association with the proposed publication data as metadata. Metadata may be descriptive (e.g., a classification, color or other description of the subject matter, etc.) of the subject matter that the proposed publication data describes. Alternatively or additionally, the metadata may be descriptive of the proposed publication data itself (e.g., its length, language or other description of publication data, etc.). An example modification module 107 may modify the proposed publication data by including the modification data within the proposed publication data.

In some embodiments, words offered by sellers as proposed publication data are not randomly selected but are considered appropriate to describe an item because a certain number of sellers and/or buyers would typically and/or customarily use the words to describe a particular item.

The proposed publication data (e.g., offered by the seller) may relate in various ways to the past publication data and demand data within the storage module 109. The greater the correspondence between the proposed publication data and the past publication data, the stronger a modification data may be generated. Stronger modification data may equate to a higher probability that the item that is to be published will be associated with certain interactions (e.g., a successful transaction, finding an item and/or purchasing a published item) between a publication originator and a publication querier, after being modified with the modification data and published. In an example embodiment, correspondence between the proposed publication data and the past publication data increases with the quantity of information used to describe an item with proposed publication data and/or with the quality of the past publication data used to generate the modification data. The quality of the past publication data may be measured with the demand data (described above).

A seller who submits a relatively large quantity of publication data (e.g., descriptive text or words) to a modification module 107 and uses relatively high quality past publication data may receive relatively strong modification data.

At block 214, the method 200 may detect a level of correspondence between the proposed publication data and the past publication data. The level of correspondence may correlate with the probability that the proposed publication will be associated with an interaction (e.g., a second interaction or a successful transaction, or other interaction, etc.) between the publication originator (e.g., the second publication originator or the seller who submits the proposed publication data) and a publication querier (e.g., the second publication querier or a buyer searching for an item listing) after modifying the proposed publication data with the modification data.

In an example embodiment, the greater the number of words offered as proposed publication data by a seller to describe an item, the greater the chances that the existing or past publication data (e.g., stored within the storage module 109) shares a word in common with the seller's proposed publication data. The modification module 107 may associate the words common to past publication data and proposed publication data with other descriptive words and recommend the other descriptive words to describe the item.

Past publication data may include name-value pairs that associate names with values. In an example embodiment the past publication data includes the name-value pairs: name=title, value=30 GB Video iPod Black and name=category, value=MP3 Players>Apple>30 GB.

In an example embodiment, sellers provide name-value pairs to the modification module 107 as proposed publication data. A seller who provides the name-value pair: title=30 GB Video iPod Black, may receive weaker modification data than a seller who additionally provides the name-value pair: category=MP3 Players to the modification module 107. In this embodiment, the seller whose proposed publication data more closely corresponds with the past publication data may receive stronger (e.g., a more useful or more effective) modification data. In this embodiment, the quantity of publication data (e.g., proposed by the seller) may affect the strength of the modification data.

At block 216 in FIG. 3, the method 200 generates multiple instances of the modification data (e.g., the first modification data) and provides them (e.g., to the seller or publication originator) in an order according to the probability that the proposed publication data (e.g., the second publication data) would be associated with an interaction (e.g., the second interaction or a successful transaction, etc.) if the proposed publication data were modified with each instance of the modification data and published.

A seller may wish to create and publish a listing for an item and may provide a title and category describing the item to an online marketplace via a user interface. An example method for making a recommendation to a seller may include receiving the title and category to describe a item.

The online marketplace may then determine whether any other items within the online marketplace correspond (e.g., are described by the same or similar title and/or category) to the item described by title and category provided by the seller.

In an example embodiment, determining whether there is a correspondence includes measuring a level of similarity between title and category description of the seller's item and an item already in the online marketplace. If a corresponding item is found and the corresponding item has been purchased in the past, the system may select other words used to describe the corresponding item (e.g., a description describing the second item). The selecting of the description may also be based on the frequency that the corresponding item has been viewed, bid on, or added to a monitoring list, etc., since it has been in the online marketplace.

The system may then recommend the selected description to the seller to be used to describe the seller's item. In this embodiment, the quality of the past publication data (e.g., the description of the corresponding item) may affect the strength of the modification data (e.g., the recommendation).

As described above, past publication data may include name-value pairs that define attributes of an item. In an example embodiment, an item may be associated with several name-value pairs (e.g., defined by a seller or by recommendation). Analogous to the generation of modification data described above, the modification module 107 may provide top ranked names and/or values for the item based on the past publication data and/or the seller's proposed publication data and/or the demand data. A portion of the highest ranked names and/or values may be made available to publication searchers, browsers and/or sellers listing their items. In an example embodiment, the modification module 107 both ranks and provides the ranked instances of modification data to the seller.

Figure 4:
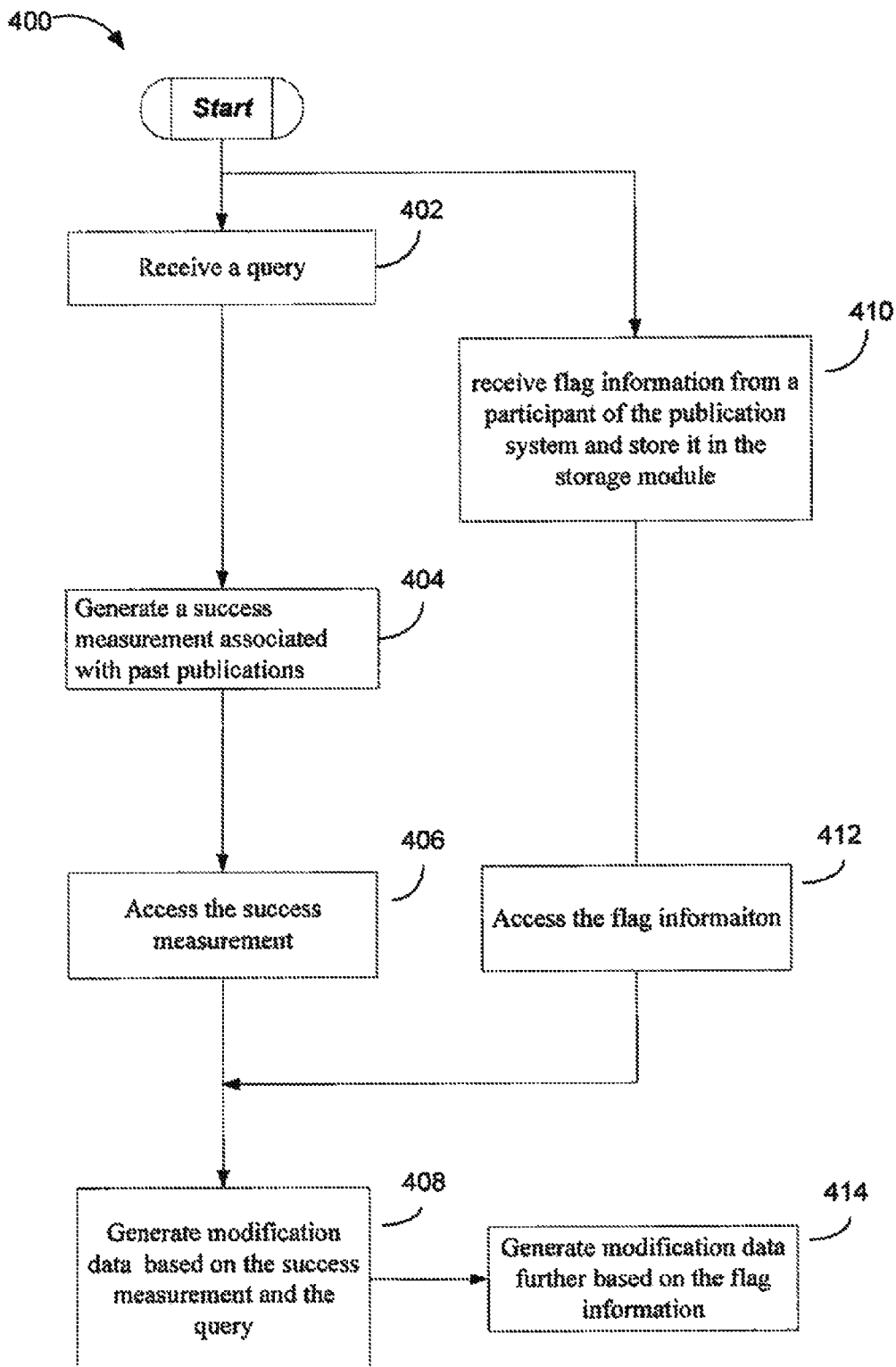
FIG. 4 is a flow diagram illustrating a further method in accordance with an example embodiment for generating modification to modify publication data.

FIG. 4 is a flow chart of a further method for generating modification data, in accordance with an example embodiment. The method 400 starts at block 402 with (e.g., the modification module 107) receiving a query.

Referring to FIG. 1, the network device 103 may include an interface to receive the query from a publication querier (e.g., the third publication querier) and to forward the query to the modification module 107. The query may be to locate subject matter that is associated with or related to the items described by the past publication data (e.g., the first publication data) and/or the proposed publication data and/or the first modification data.

At block 404, the method 400 (e.g., the success measurement module 104) may generate at least one success measurement (e.g., the second demand data) associated with past publications (e.g., the first and second publications) within the publication system.

In an example embodiment, the second demand data includes the first demand data (e.g., the second demand data includes success measurement associated with the past or first publication data) and is to include a second demand measurement that registers an interaction (e.g., the second interaction, e.g., a financial transaction) between an earlier querier (e.g., the second querier, e.g., a buyer searching for an item listing) and the publication originator (e.g., the second publication originator, e.g., a seller posting a listing), if the second interaction has occurred. At block 406, the method 400 may access the success measurement (e.g., the demand measurement) that may be located within the storage module 109, in an example embodiment.

At block 408, the modification module 107 may generate modification data (e.g., the second modification data) with which to modify the query. The modification may be based on the success measurement and the query. As described above, an example success measurement may include a e.g., second demand measurement made on proposed publication data (e.g., the second publication data) modified e.g., with the first modification data. The modification data may be offered in the form of a search term or a browse path to help a querier or a buyer describe a desired item in a way that may improve the probability that a published item will be located and/or purchased.

The modification data generated for a query may be generated and provided analogously to the modification data used to modify proposed publication data, which is described in detail above.

The modification data may be based on input in addition to past publication data, demand data, proposed publication data and query information. At block 410, may include receiving flag information from a participant of the publication system and storing it in the storage module 109. The flag information may indicate that an erroneous description has been made of a published item (for example in the first or second publication). Mischaracterized items may have been described with publication data such that typical (e.g., average) sellers and buyers would not associate the publication data with the actual item to be sold.

At block 412, the modification module 107 may access the flag information from the storage module 109 and at block 414 generate modification data (e.g., the first or second modification data) further based on the flag information.

Other embodiments can be accomplished by way of software. For example, some embodiments may be provided as a computer program product or software which may include a machine or computer-readable medium having stored thereon instructions which may be used to program a computer (or other electronic devices) to perform a process according to the present invention. In other embodiments, processes of the present invention may be performed by specific hardware components that contain hardwired logic for performing the processes, or by any combination of programmed computer components and custom hardware components.

In an embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Figure 5:
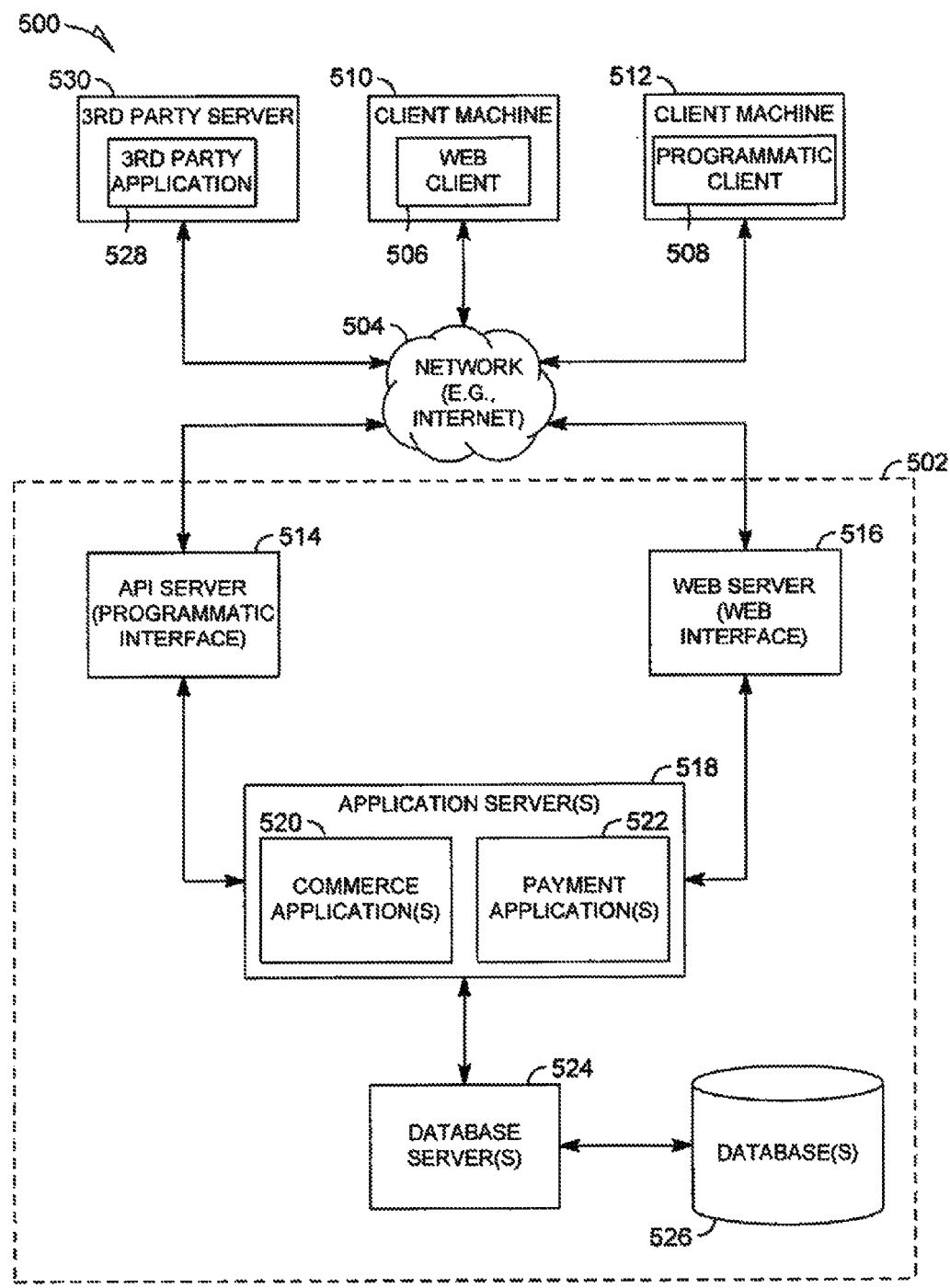
FIG. 5 illustrates a block diagram of a system according to an example embodiment, using a client-server architecture.

FIG. 5 illustrates a block diagram of a system 500, according to an example embodiment, using a client-server architecture. A network-based commerce system 502 (e.g., a network-based commerce system facilitating transactions between multiple sellers and multiple buyers) provides server-side functionality, via a network 504 (e.g., the Internet) to one or more clients, such as a web client 506 (e.g., a browser, such as the Internet Explorer browser developed by Microsoft Corporation of Redmond, Wash. or the FireFox browser provided by Mozilla Corporation of Mountain View, Calif.), and a programmatic client 508 executing on respective client machines 510 and 512. An Application Program Interface (API) server 514 and a web server 516 may be coupled, and provide program and web interfaces respectively, to one or more application servers 518.

The web client 506 may access the various commerce and payment applications 520 and 522 via the web interface supported by the web server 516. In an example embodiment, the buyer using web client 506 submits searches for items and browses the electronic marketplace for items via the network 504 and the web server 516.

Similarly, the programmatic client 508 can access the various services and functions provided by the commerce and payment applications 520 and 522 via the program interface of the API server 514. The programmatic client 508 may, for example, comprise a seller application (e.g., the TurboLister application developed by eBay Inc., of San Jose, Calif.) to enable sellers to submit listings to the commerce system 502 and receive recommended publication data in return.

The application servers 518 may host one or more commerce applications 520 and payment applications 522. The application servers 518 may, in turn, be coupled to one or more database servers 524 that facilitate access to one or more databases 526. In example embodiments, the modification module 107 and the storage module 109 as described with respect to FIG. 3 may be included within the commerce applications 520, the database server 524 and the databases 526.

The commerce applications 520 provide a number of commerce functions and services to users that access the commerce system 502. The payment applications 522 likewise provide a number of payment services and functions to those users. While the commerce and payment applications 520 and 522 shown in FIG. 5 form part of the network-based commerce system 502, it will be appreciated that, in alternative embodiments of the invention, the payment applications 522 may form part of a payment service that is separate and distinct from the commerce system 502. The various commerce and payment applications 520 and 522 can also be implemented as standalone software programs with or without individual networking capabilities.

A third party application 528 executing on a third party server machine 530 may also have programmed (e.g., computer-implemented) access to the network-based commerce system 502 via the program interface of the API server 514. For example, the third party application 528 may, utilizing information retrieved from the network-based commerce system 502, support one or more features or functions on a website hosted by the third party. The third party website may, for example, provide one or more promotional, commerce, or payment functions that are supported by the relevant applications of the network-based commerce system 502.

Figure 6:
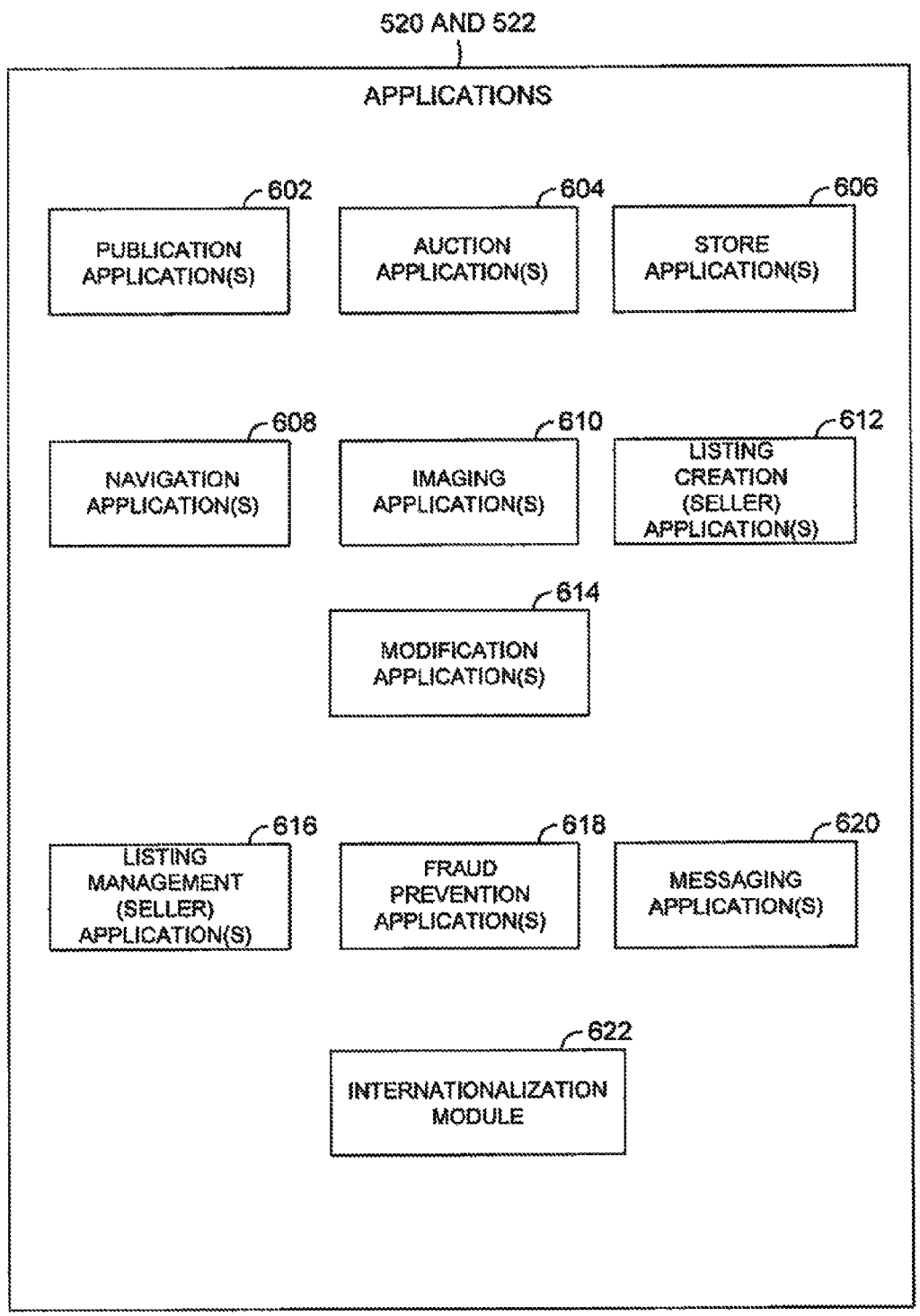
FIG. 6 is a block diagram illustrating multiple commerce and payment applications in accordance with example embodiments.

FIG. 6 is a block diagram illustrating multiple commerce and payment applications 520 and 522 that, in an example embodiment of the invention, are provided as part of the network-based commerce system 502. The commerce system 502 may provide a number of listing and price-setting mechanisms whereby a seller may list items, e.g., goods or services, for sale, a buyer can express interest in or indicate a desire to purchase such items, and a price can be set for a transaction associated with the items. To this end, the commerce applications 520 are shown to include one or more publication applications 602 which publish items for sale in the network based commerce system 502. Commerce applications 520 are also shown to include auction applications 604 which support auction-format listing and price setting mechanisms (e.g., English, Dutch, Sealed First Price, Vickrey, Chinese, Japanese, Double, and Reverse auctions, etc.)

Store applications 606 allow sellers to group their listings within a "virtual" store, which may be branded and otherwise personalized by and for the sellers. Such a virtual store may also offer promotions, incentives and features that are specific and personalized to a relevant seller.

In one embodiment, the network-based commerce system 502 may support, via internationalization applications 622, a number of commerce systems that are customized, for example, for specific geographic regions. Thus, aversion of the commerce system 502 may be customized for the United Kingdom, whereas another version of the commerce system 502 may be customized for the United States. Each of these versions may operate as an independent commerce system 502, or may be provided as customized (or internationalized) presentations associated with a single common underlying commerce system 502.

Navigating the network-based commerce system 502 can be facilitated by one or more navigation applications 608. For example, a search application may enable key word searches of listings published via the commerce system 502. A browser application may permit users to browse various categories, catalogues, or inventory data structures that operate to classify listings within the commerce system 502. Various other navigation applications may be provided to supplement the search and browsing applications.

In order to make item listings available via the network-based commerce system 502 as informative and visually attractive as possible, the commerce applications 520 may include one or more imaging applications 610 that can be used to upload images for inclusion within item listings. An imaging application 610 may also operate to incorporate images within viewed listings Listing creation applications 612 may allow sellers to author listings having information associated with selected goods or services that are to be offered for sale as part of transactions conducted within the commerce system 502. These listing creation applications 612 may receive offer data associated with offerings from a plurality of potential sellers. Listing creation applications may interface with the modification module 107 to communicate descriptive data such as publication data and modification data.

The modification applications, which may form a part of the navigation applications 608 and/or the listing creation applications 612, may be used to recommend names and values for a listing provided by a seller using the techniques disclosed herein. Modification applications 614 may implement example modification module 107. The modification applications 614 may include an API. In an example embodiment, a seller passes a listing that includes a title and a category; the API may then return modification data called a "tag" that is a name-value pair for the subject of the listing. The information in the listing provided by the seller and received by the API may (1) not have previously been stored within the network-based commerce system 502, (2) have been partially stored within the network-based commerce system 502 or (3) have completely been stored within the network-based commerce system 502. Existing listings (e.g., completely stored within the network-based commerce system 502) may be referenced with category identifiers. The API may return a complete tag (e.g., name and value) or a partial tag (name only). As described above, recommended name-value pairs may increase the probability that a buyer will find the listing.

Listing management applications 616 allow sellers to manage one or more of the listings that may have been created using a variety of mechanisms, including the listing creation applications 612 described above. The listing management applications 616 may provide a number of features (e.g., auto-relisting, inventory level monitors, etc.) to assist the seller in managing such listings.

Fraud prevention applications 618 may be used to implement various fraud detection and prevention mechanisms to reduce the occurrence of fraud within the commerce system 502. In an example embodiment, the fraud prevention application 618 receives "flags" from users that indicate an inappropriate description of a listing. An inappropriate listing may be one that is not readily recognizable by buyers or sellers as a description of an item offered for sale. In an example embodiment, the fraud prevention applications 618 may form part of the listing creation applications 612 and/or the modification applications 614. The flag, the associated item and the listing may be stored to later be accessed by the modification applications 614 in the generation of modification data.

Messaging applications 620 can be used to generate and deliver messages to users of the network-based commerce system 502. Such messages may be used in some embodiments to deliver modification data to sellers and buyers in response to a seller's proposed listing or a buyer's query. Messages may also be used to advise users regarding the status of item listings within the commerce system 502 (e.g., providing "you have been outbid" notices to bidders during an auction process or to provide promotional and merchandising information to users).

Figure 7:
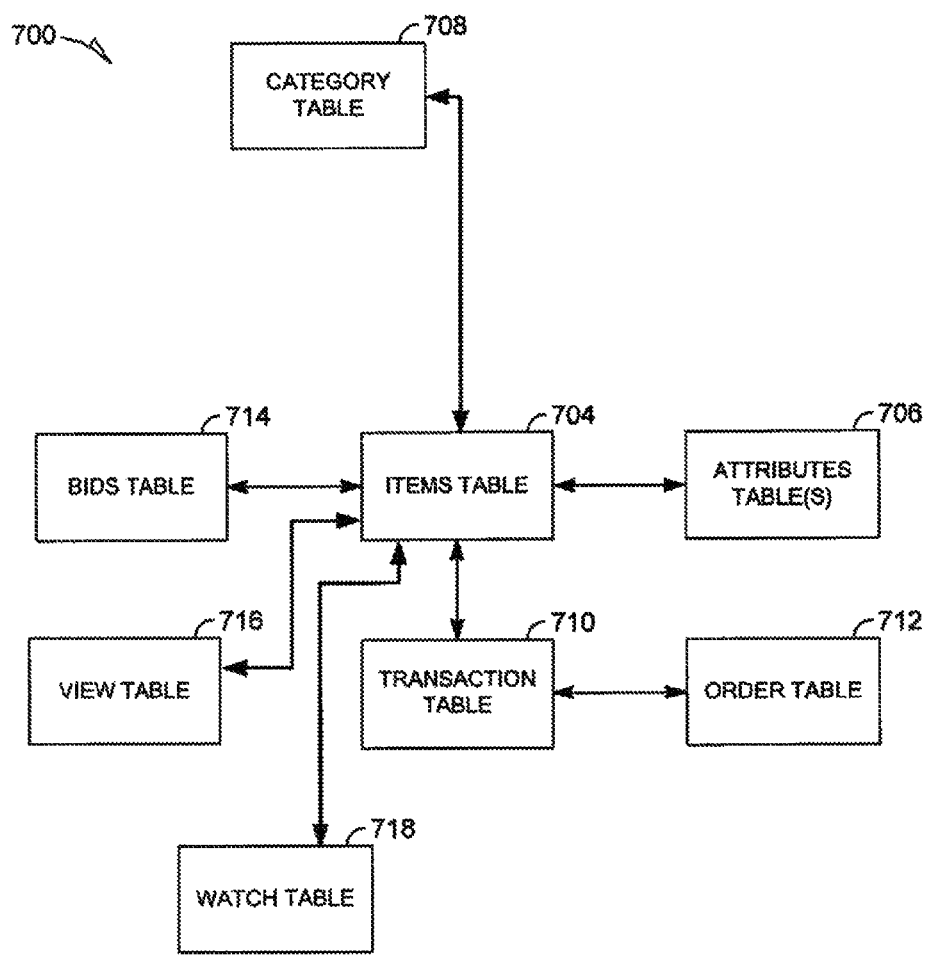
FIG. 7 is an table-relationship diagram in accordance with example embodiments.

FIG. 7 is a high-level entity-relationship diagram, illustrating various tables 700 that may be maintained within the database servers 524 and databases 526, and that are utilized by the commerce and payment applications 520 and 522.

The tables 700 include an items table 704 in which item records are maintained for offerings, i.e. goods and services that are available to be, or have been, sold, via the commerce system 502. Each item record includes offer data which includes seller identification data and offering identification data that provides detailed information on each offering. For example, a description of the goods or service offered or sold (e.g., item title, keywords) may be provided, together with a photograph or other information relating to the offering. The modification applications may access the tables 700 to collect various types of data related to items, as part of generating modification data.

One or more attributes tables 706 may be used to record attribute information pertaining to items for which records exist within the items table 704. Considering a single example of such an attribute, the attributes tables 706 may indicate a brand attribute associated with a particular item, the brand attribute identifying a licensor or manufacturer of the relevant item as specified by a seller. Other attributes may include size, shape, color, construction material, country of manufacture, etc.

The category table 708 may be populated with categories with which items for sale may be associated, and which buyers may use to search for items of particular interest. One example of a category is "clothing and accessories." Others, include, but are certainly not limited to: "computers and office equipment," "motor vehicles," and "toys." The categories may be accessible in the form of a category listing tree, including sub-categories. To further the example, sub-categories for the "computers and office equipment" category may include, but are not limited to: "laptop computers" and "desktop computers". Leaf categories for laptop computers may include, but are not limited to: "14" screen or smaller" and "15" screen or larger."

A transaction table 710 contains a record for each transaction (e.g., a purchase transaction) pertaining to items for which records exist within the items table 704.

An order table 712 is populated with order records, each order record being associated with an order. Each order, in turn, may be associated with one or more transactions for which records exist within the transaction table 710.

Bid records within a bids table 714 each relate to a bid received at the network-based commerce system 502 in connection with an auction-format listing supported by an auction application 604. Bid data typically includes item identification data, which may be obtained from, or linked to, the items table 704. Bid data also includes a bid amount View records within a view table 716 contain a record for each item in the items table 704 related to the viewing activity of users. Watch list records within watch list table 718 contain a record for each item in the items table 704 being monitored for future reference.

Figure 8:
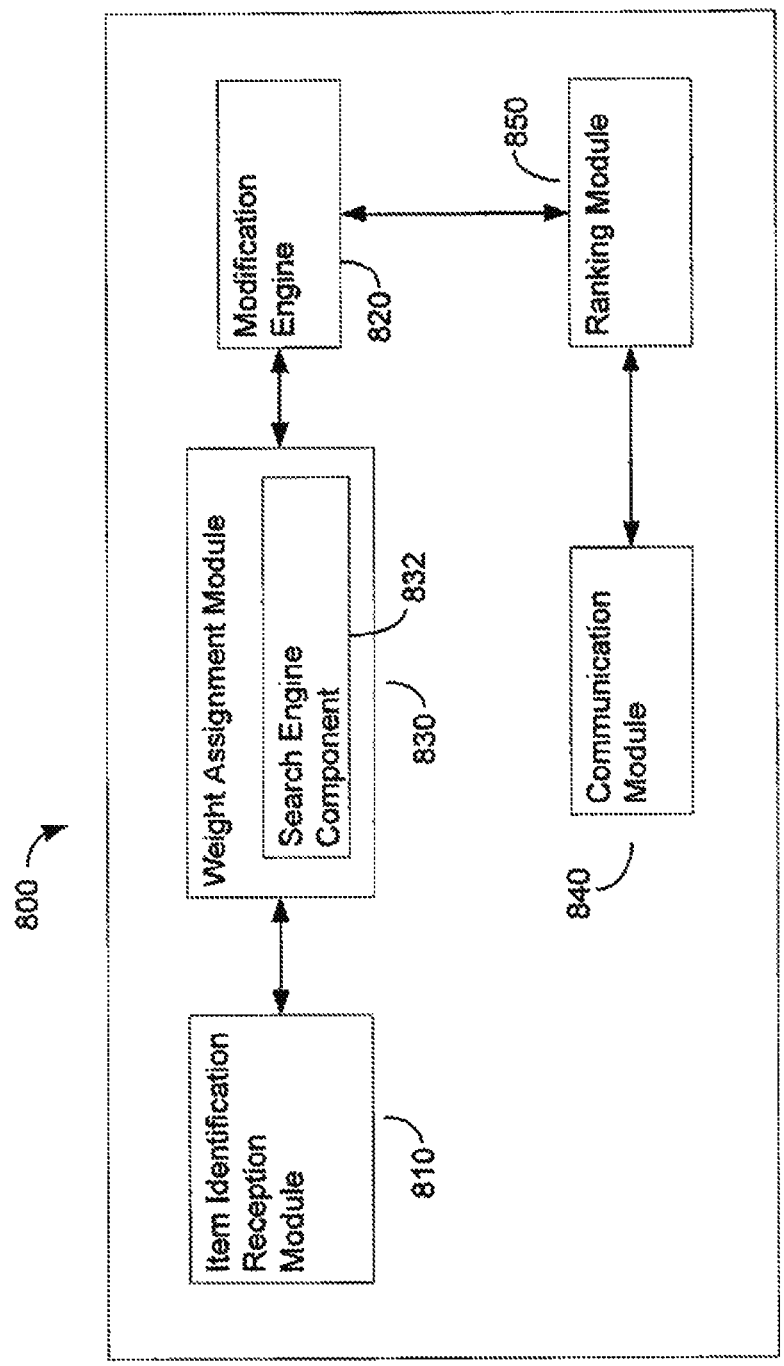
FIG. 8 is a block diagram illustrating relationships amongst modification applications in accordance with example embodiments.

FIG. 8 is a block diagram illustrating relationships amongst modification applications 614 and includes an item identification reception module 810, modification engine 820, a weight assignment module 830, a search engine component 832, a communication module 840 and a ranking module 850. The item identification reception module 810 receives a request from the potential seller that includes the seller item identification (e.g., an item title that the seller proposes to associate with the item for sale, such as "Grayco Baby Stroller"). The request may also include an identification of the seller site (e.g., "North America," or "United Kingdom," or "SYSID0001"). If no identification of the seller site is received, the identity of the seller site may be assumed by the system 502.

The weight assignment module 830 may then access past publication data and/or demand data corresponding to the item identification in the items table 704. The past publication data and/or demand data subject to any percentage weight assignment may subsequently be used to determine recommended listing information that is most appropriate for the item. A search engine component 832 may be included in the weight assignment module 830 to calculate the weights and to locate past publication data and/or demand data throughout the system 502 associated with the seller's item identification. In an example embodiment, the search engine component 832 retrieves past publication data and/or demand data from tables within the databases 524, 526 in FIG. 5 (e.g., FIG. 7, items table 704, transactions table 710, orders table 712, bids table 714, attributes tables 706, category table 708 and/or other tables that include information to be used in the computation of modification data computation, etc.). The search engine component 832 may comprise any number and type of search engines known to those of skill in the art.

In an example embodiment, the modification engine 820 operates to use the seller's item identification and past publication data from successfully sold items (e.g., stored in the item table 94) to generate modification data. The relative strength of the modification data may be calculated by processors included in the system 502 to identify the modification data best suited to describe the item.

The communication module 840, which may form a part of the messaging applications 620 (shown in FIG. 6), may be used to communicate requests, or parts of requests (e.g., the item identification, such as the item title; and the seller site identification) to the item identification reception module 810. The communication module 840 may also be used to receive and communicate modification data (as provided by the modification engine 820) to the seller, from which the seller may choose. The modification may be displayed in histogram form, as described in more detail below.

Thus, referring now to FIGS. 6, 7, and 8, in some embodiments, a system 502 may include an interface (e.g., as part of the web server 516 or the item identification reception module 810) to receive requests including seller item identifications, and perhaps identifications of corresponding seller sites. The interface may comprise a network communications interface, such as a computer, a server, or a network interface card, either wired or wireless.

The system 502 may also include one or more modules (e.g., such as a ranking module 850 shown in FIG. 8, perhaps included as part of the application server(s) 518) to calculate rank histograms corresponding to modification data communicated to a seller.

In some embodiments, the system 502 may include one or more database components, including tables (e.g., the tables 700 shown in FIG. 7 which may be stored and accessed as part of the database server(s) 524 and/or database(s) 526 of FIG. 5). The system 502 may also include a search engine component (e.g., search engine component 832) to locate information about items stored in the tables mentioned above.

Various parts of the system 502 may be used to store different types of data. For example, in some embodiments, the system 502 may have one or more servers (e.g., database server(s) 524 in FIG. 5) that include the item information (e.g., past publication data and/or demand data). The system 502 may also have one or more servers that include the interface to receive the request from the seller (e.g., the web server 516 in FIG. 5). Many other arrangements are possible.

Figure 9:
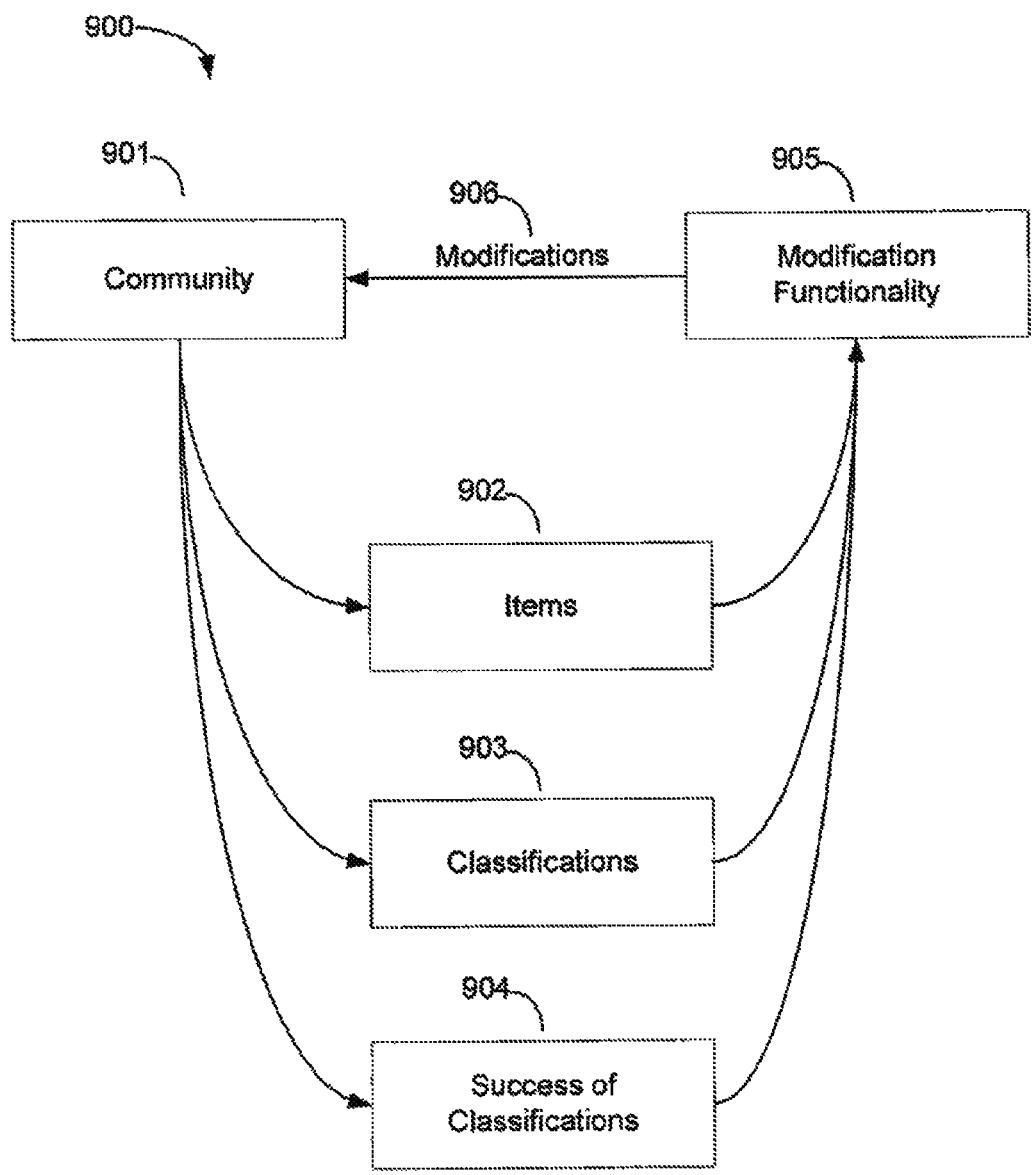
FIG. 9 is a block diagram illustrating information flow amongst entities in accordance with an example electronic publication system.

FIG. 9 is a block diagram illustrating information flow amongst entitles in an electronic publication system 900 in accordance with an example embodiments.

An example electronic publication system 900 may observe how community members 901 have classified items 902 (and e.g., see classifications 903) and it may determine the success of the classifications 904 (discussed above) over a period of time. With this feedback from the community 901 (e.g., the observed data), the modification functionality 905 may perform analyses to generate modification data 906 (e.g., recommended classifications). A modified classification (not shown) may help the community 901 (e.g., a publication originator) accurately classify subject matter or help the community 901 (e.g., a publication querier) to find a publication within the system. Since the community's classifications 903 (e.g., descriptions of items) may change over time, example embodiments described herein may dynamically evolve accurate item classifications 903 through community 901 feedback. These accurate item classifications 903 may increase the frequency of connections between publications and those querying them.

It is to be appreciated that the network publication system 900 may help the community 901 evolve classifications 903 for publications with little or no human intervention. Through an iterative process, the system 900 may provide increasingly strong modifications by adjusting modifications based on the popularity (e.g., the acceptance/rejection) of previous modifications.

Figure 10:
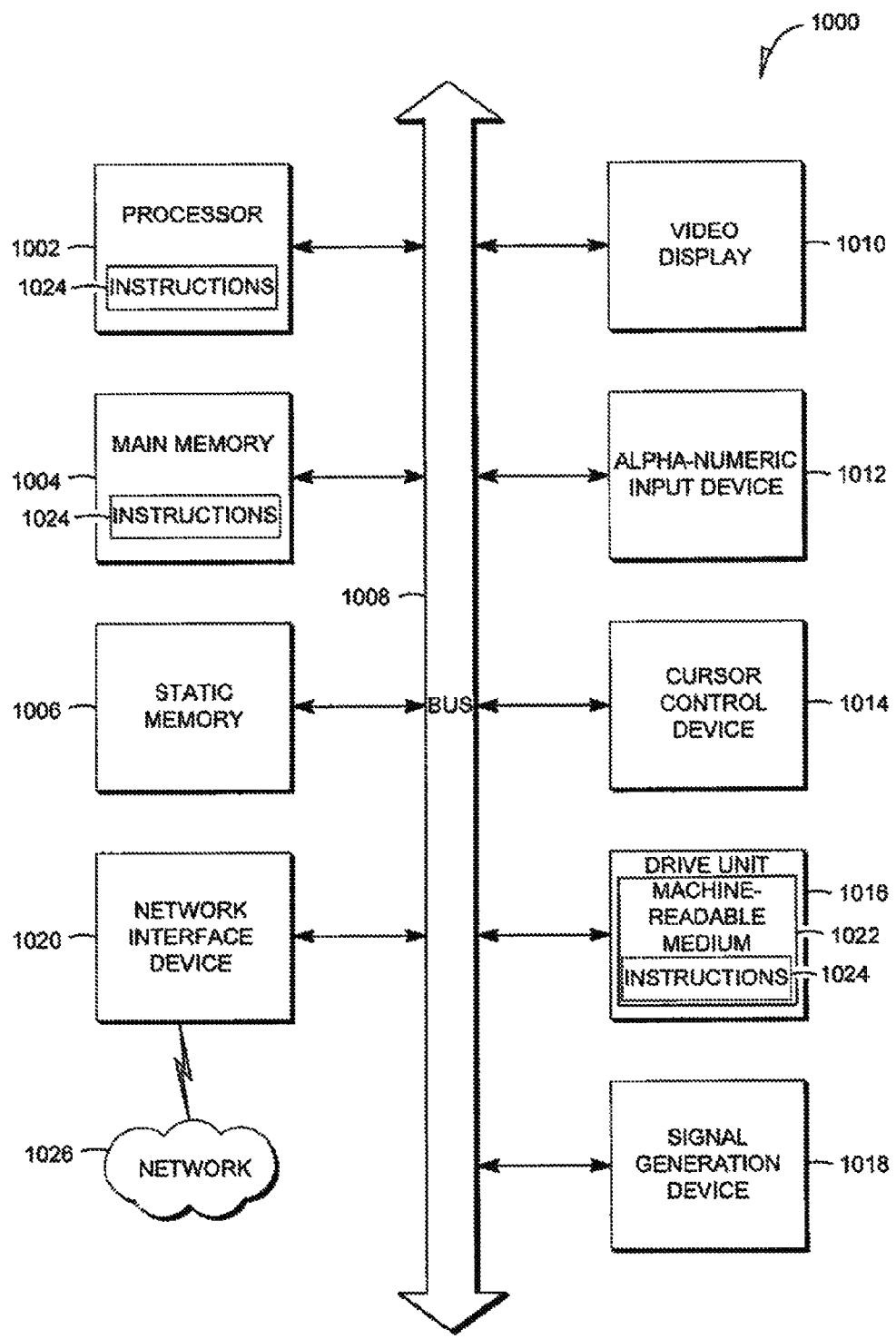
FIG. 10 is a block diagram illustrating a computer system in accordance with example embodiments.

FIG. 10 is a block diagram illustrating a computer system 1000 in accordance with example embodiments. Within the computer system 1000 are a set of instructions for causing the machine to perform any one or more of the methodologies discussed herein. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., file transfer protocol (FTP)).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Electronic publication systems having a community of users such as those described in the example embodiments above may observe the community's preferred classifications of items over a period of time. With its observation, the electronic publication system may collect and recommend the historically most successful classifications for and item. Modifications may help publishers correctly classify the subject matter of their publications or help a community member find a publication. Since the community's preferred classifications may change over time, embodiments may dynamically evolve classifications and may improve connection between publications and those searching for them.

Example embodiments of electronic publications systems described herein may decentralize the assignment of classifiers to items within the electronic publication systems. Instead of the electronic publication system classifying items, community users are enabled to classify their own items or items they wish to locate. The electronic publication system may provide recommended classifications through analysis, based on its accumulation of historical community behavior.

Thus, a method and system for providing modification data to describe an item has been described. It is to be understood that the above description is intended to be illustrative and not restrictive. Some example embodiments are disclosed with respect to a particular technological environment and demonstrate a particular aspect. Other embodiments will be apparent in other technological environments and may demonstrate other aspects. Many other embodiments will be apparent to those of skill in the art upon reading and understanding the above description. The scope should, therefore, be determined with reference to the appended claims, along with the full scope of equivalents to which such claims are entitled.

What is claimed is:

1. A method comprising:
   receiving proposed publication data describing an item to be published to a publication system;
   generating a success measurement indicating demand associated with at least one past publication related to the item of the proposed publication data;
   generating, using a processor of a machine, modification data for modifying the proposed publication data, the modification data being based on the success measurement and the proposed publication data; and
   providing the modification data to a device of an originator of the proposed publication data.

2. The method of claim 1, further comprising detecting a level of correspondence between the proposed publication data and the at least one past publication.

3. The method of claim 2, wherein the level of correspondence comprises a measure of similarity between a title or category description of the proposed publication data and the at least one past publication.

4. The method of claim 2, wherein the generated modification data is stronger modification data based on a higher level of correspondence.

5. The method of claim 2, wherein the level of correspondence is based on one or more name-value pairs of the proposed publication data.

6. The method of claim 1, further comprising assigning a proportional weight to at least one of the past publication data or demand data, the proportional weight controlling a corresponding level of effect of the modification data.

7. The method of claim 1, wherein the providing of the modification data to a device comprises providing the modification data as proposed modification data for the proposed publication data.

8. The method of claim 1, wherein the providing of the modification data to a device comprises providing the modification data as compulsory modification data for the proposed publication data.

9. The method of claim 1, wherein the proposed publication data is associated with a description for an item, the modification data being description information from the at least one past publication for a similar item.

10. The method of claim 1, wherein the proposed publication data is a query, the modification data being data to modify the query.

11. The method of claim 1, wherein the generating of the modification data comprises generating multiple instances of the modification data, the method further comprising:
    ordering the multiple instances of the modification data according to a probability that the proposed publication data modified with each instance of the modification data results in a specific interaction; and
    providing the ordered multiple instances to the device of the originator of the proposed publication data.

12. The method of claim 1, wherein the demand comprises at least one selection from the group consisting of viewing of the at least one past publication, selling an item described in the at least one past publication, adding the at least one past publication to a watch list, and returning the at least one past publication as a search result based on a query.

13. A non-transitory machine readable medium storing instructions which, when executed by at least one processor of a machine, cause the machine to perform operations comprising:
    receiving proposed publication data describing an item to be published to a publication system;
    generating a success measurement indicating demand associated with at least one past publication related to the item of the proposed publication data;
    generating, using a processor of a machine, modification data for modifying the proposed publication data, the modification data being based on the success measurement and the proposed publication data; and
    providing the modification data to a device of an originator of the proposed publication data.

14. The non-transitory machine readable medium of claim 13, wherein the operations further comprise detecting a level of correspondence between the proposed publication data and the at least one past publication.

15. The non-transitory machine readable medium of claim 13, wherein the operations further comprise assigning a proportional weight to at least one of the past publication data or demand data, the proportional weight controlling a corresponding level of effect of the modification data.

16. The non-transitory machine readable medium of claim 13, wherein the providing of the modification data to the device comprises providing the modification data as proposed modification data for the proposed publication data.

17. The non-transitory machine readable medium of claim 13, wherein the providing of the modification data to the device comprises providing the modification data as compulsory modification data for the proposed publication data.

18. The non-transitory machine readable medium of claim 13, wherein the proposed publication data is a query, the modification data being data to modify the query.

19. The non-transitory machine readable medium of claim 13, wherein the generating of the modification data comprises generating multiple instances of the modification data, the operations further comprising:
    ordering the multiple instances of the modification data according to a probability that the proposed publication data modified with each instance of the modification data results in a specific interaction; and
    providing the ordered multiple instances to the device of the originator of the proposed publication data.

20. A system comprising:
    a processor of a machine;
    a modification module configured to receive proposed publication data describing an item to be published to a publication system; and
    a success measurement module configured to generate a success measurement indicating demand associated with at least one past publication related to the item of the proposed publication data,
    the modification module further configured to generate, using the processor, modification data for modifying the proposed publication data, the modification data being based on the success measurement and the proposed publication data.

* * * * *